(12) United States Patent
Li et al.

(10) Patent No.: US 12,488,428 B2
(45) Date of Patent: Dec. 2, 2025

(54) UNIVERSAL STYLE TRANSFER USING MULTI-SCALE FEATURE TRANSFORM AND USER CONTROLS

(71) Applicant: Adobe Inc., San Jose, CA (US)

(72) Inventors: Yijun Li, Seattle, WA (US); Ionuț Mironică, Bucharest (RO)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/474,588

(22) Filed: Sep. 26, 2023

(65) Prior Publication Data

US 2024/0020810 A1 Jan. 18, 2024

Related U.S. Application Data

(62) Division of application No. 17/447,893, filed on Sep. 16, 2021, now Pat. No. 11,803,950.

(51) Int. Cl.
*G06T 15/50* (2011.01)
*G06N 3/04* (2023.01)
*G06T 5/50* (2006.01)
*G06T 5/70* (2024.01)
(Continued)

(52) U.S. Cl.
CPC .................. *G06T 5/50* (2013.01); *G06N 3/04* (2013.01); *G06T 5/70* (2024.01); *G06T 7/50* (2017.01); *G06T 11/001* (2013.01); *G06T 2200/24* (2013.01); *G06T 2207/20081* (2013.01); *G06T 2207/20084* (2013.01); *G06T 2207/20221* (2013.01)

(58) Field of Classification Search
CPC .... G06T 5/50; G06T 5/70; G06T 7/50; G06T 11/001; G06T 2200/24; G06T 2207/20081; G06T 2207/20084; G06T 2207/20221; G06N 3/04; G06N 3/045; G06N 3/0464; G06N 3/08
See application file for complete search history.

(56) References Cited

U.S. PATENT DOCUMENTS 8,374,457 B1 2/2013 Wang et al.
10,061,491 B2 8/2018 Muchnick et al.
10,504,267 B2 12/2019 Simons et al.
(Continued)

OTHER PUBLICATIONS

Xu, W., Long, C., Wang, R., & Wang, G. DRB-GAN: A Dynamic ResBlock Generative Adversarial Network for Artistic Style Transfer (Aug. 19, 2021).*
(Continued)

*Primary Examiner* — Sarah Lhymn
(74) *Attorney, Agent, or Firm* — Weaver Austin Villeneuve & Sampson LLP

(57) ABSTRACT

Techniques for generating style-transferred images are provided. In some embodiments, a content image, a style image, and a user input indicating one or more modifications that operate on style-transferred images are received. In some embodiments, an initial style-transferred image is generated using a machine learning model. In some examples, the initial style-transferred image comprises features associated with the style image applied to content included in the content image. In some embodiments, a modified style-transferred image is generated by modifying the initial style-transferred image based at least in part on the user input indicating the one or more modifications.

20 Claims, 12 Drawing Sheets

(51) Int. Cl.
    G06T 7/50    (2017.01)
    G06T 11/00   (2006.01)

(56) References Cited

U.S. PATENT DOCUMENTS

| | | | |
|---|---|---|---|
| 10,769,764 | B2 | 9/2020 | Fang et al. |
| 10,957,063 | B2 | 3/2021 | DiVerdi et al. |
| 11,164,059 | B2* | 11/2021 | Zhu ............... G06K 19/06046 |
| 11,803,950 | B2 | 10/2023 | Li et al. |
| 2008/0205796 | A1 | 8/2008 | Jonsson |
| 2016/0364625 | A1 | 12/2016 | Lin et al. |
| 2017/0213112 | A1 | 7/2017 | Sachs et al. |
| 2018/0068463 | A1* | 3/2018 | Risser .................... G06T 7/45 |
| 2018/0240257 | A1 | 8/2018 | Li et al. |
| 2018/0285679 | A1 | 10/2018 | Amitay |
| 2018/0357800 | A1 | 12/2018 | Oxholm et al. |
| 2019/0026870 | A1 | 1/2019 | Hu et al. |
| 2019/0087985 | A1 | 3/2019 | Li et al. |
| 2019/0213705 | A1 | 7/2019 | Kamath et al. |
| 2019/0228587 | A1 | 7/2019 | Mordvintsev et al. |
| 2019/0244329 | A1 | 8/2019 | Li et al. |
| 2019/0279346 | A1 | 9/2019 | Zhang et al. |
| 2019/0333198 | A1 | 10/2019 | Wang et al. |
| 2019/0370936 | A1 | 12/2019 | Zhang et al. |
| 2020/0134834 | A1 | 4/2020 | Pao et al. |
| 2020/0226419 | A1 | 7/2020 | Knaan et al. |
| 2020/0226440 | A1* | 7/2020 | Zhu ............... G06K 19/06103 |
| 2020/0258204 | A1 | 8/2020 | Fang et al. |
| 2020/0311986 | A1 | 10/2020 | Tong et al. |
| 2020/0334819 | A1* | 10/2020 | Chen .................... G06V 10/454 |
| 2021/0012181 | A1* | 1/2021 | Zhu ........................ G06N 3/08 |
| 2021/0097691 | A1 | 4/2021 | Liu |
| 2021/0118146 | A1* | 4/2021 | Rhodes ................. G06N 3/045 |
| 2021/0150197 | A1* | 5/2021 | Kokkinos ............. G06V 10/74 |
| 2021/0209464 | A1 | 7/2021 | Bala et al. |
| 2021/0271919 | A1 | 9/2021 | Yang et al. |
| 2021/0279938 | A1 | 9/2021 | Chandran et al. |
| 2021/0365710 | A1* | 11/2021 | Zhu ........................ G06T 11/60 |
| 2021/0407200 | A1* | 12/2021 | Fu .......................... G06T 17/205 |
| 2022/0012536 | A1* | 1/2022 | Wang ................ G06V 30/19173 |
| 2022/0092108 | A1* | 3/2022 | Collomosse ......... G06F 16/5838 |
| 2022/0108417 | A1* | 4/2022 | Liu ...................... G06T 1/0007 |
| 2022/0114698 | A1* | 4/2022 | Liu ........................ G06T 3/04 |
| 2022/0172322 | A1 | 6/2022 | Prins et al. |
| 2022/0198691 | A1 | 6/2022 | Chen et al. |
| 2022/0222873 | A1* | 7/2022 | Shreshtha ............. G06T 7/0012 |
| 2022/0253970 | A1* | 8/2022 | Ahn ....................... G06T 7/00 |
| 2022/0279183 | A1* | 9/2022 | Besenbruch .......... G06T 3/4046 |
| 2022/0284642 | A1* | 9/2022 | Hsiao .................... G06N 3/045 |
| 2022/0292651 | A1* | 9/2022 | Fu ......................... G06T 7/13 |
| 2022/0405882 | A1* | 12/2022 | Ferrés ................... G06T 3/4046 |
| 2023/0368807 | A1* | 11/2023 | Liu ........................ G10L 25/30 |
| 2024/0013446 | A1* | 1/2024 | Alshina .................. G06T 9/002 |

OTHER PUBLICATIONS

He, Tianyu, Xu Tan, Yingce Xia, Di He, Tao Qin, Zhibo Chen, and Tie-Yan Liu. "Layer-wise coordination between encoder and decoder for neural machine translation." Advances in Neural Information Processing Systems 31 (2018).*

Burt, P. J., et al., "The Laplacian Pyramid as a Compact Image Code," IEEE Transactions on Communications, Apr. 1983, vol. COM-31(4), pp. 532-540.

Cimpoi, M., et al., "Describing Textures in the Wild," CVPR, Jun. 2014, 8 pages, DOI: 10.1109/CVPR.2014.461.

Gatys, L A., et al., "Texture Synthesis Using Convolutional Neural Networks," NIPS, Nov. 6, 2015, 10 pages, URL: https://arxiv.org/abs/1505.07376v3.

He, K., et al., "Deep Residual Learning for Image Recognition," CVPR, Jun. 2016, 9 pages, DOI: 10.1109/CVPR.2016.90.

Huang, X., et al., "Arbitrary Style Transfer in Real-time with Adaptive Instance Normalization," ICCV, Jul. 30, 2017, 11 pages, URL: https://arxiv.org/abs/1703.06868v2.

Johnson, J., et al., "Perceptual Losses for Real-Time Style Transfer and Super-Resolution," ECCV, Mar. 27, 2016, 18 pages, URL: https://arxiv.org/abs/1603.08155v1.

Lin, T-Y., et al., "Microsoft COCO: Common Objects in Context," ECCV, Feb. 21, 2015, 15 pages, URL: https://arxiv.org/abs/1405.0312v3.

Li, Y., et al., "Universal Style Transfer via Feature Transforms," NIPS, Nov. 17, 2017, 11 pages, URL: https://arxiv.org/abs/1705.08086v2.

Mertan, A., "Application and analysis of deep learning techniques on the problem of depth estimation from a single image," Master's Thesis, Istanbul Technical University, Istanbul (TR), Jul. 2020, 120 pages.

Mertan, A., et al., "Single Image Depth Estimation: An Overview," Apr. 13, 2021, 18 pages, URL: https://arxiv.org/abs/2104.06456v1.

Simonyan, K., et al., "Very Deep Convolutional Networks for Large-Scale Image Recognition," ICLR, Apr. 10, 2015, 14 pages, URL: https://arxiv.org/abs/1409.1556v6.

Ulyanov, D., et al., "Texture Networks: Feed-forward Synthesis of Textures and Stylized Images," ICML, Mar. 10, 2016, 16 pages, URL: https://arxiv.org/abs/1603.03417v1.

U.S. Final Office Action dated May 4, 2023 in U.S. Appl. No. 17/447,893.

U.S. Non-Final Office Action dated Jan. 5, 2023, in U.S. Appl. No. 17/447,893.

U.S. Notice of Allowance dated Jul. 7, 2023 in U.S. Appl. No. 17/447,893.

U.S. Restriction Requirement dated Sep. 30, 2022 for U.S. Appl. No. 17/447,893.

* cited by examiner

UNIVERSAL STYLE TRANSFER USING MULTI-SCALE FEATURE TRANSFORM AND USER CONTROLS

CROSS-REFERENCE TO RELATED APPLICATIONS

This application is a division of U.S. patent application Ser. No. 17/447,893 filed Sep. 16, 2021, entitled "UNIVERSAL STYLE TRANSFER USING MULTI-SCALE FEATURE TRANSFORM AND USER CONTROLS," the content of which is incorporated herein by reference in its entirety.

BACKGROUND

Users are increasingly interested in being able to easily manipulate and/or modify images. One example of image manipulation is style transfer, where a visual style of a style image is applied to the content of a content image. In one example, the style image has a style of a pencil sketch, and when the visual style of the style image is applied to a content image such as a photograph, the content image is transformed into a style-transferred image having the content of the photograph but rendered as a pencil sketch. Style transfer is an example of image manipulation that is popular with content creators, as it allows a content creator to creatively manipulate images to generate expressive artwork.

However, implementing style transfer is difficult and resource-intensive. For example, because of the vast number of different style types (e.g., pencil sketches, black and white photographs, bold primary colored artwork, oil painting, watercolor brushstrokes, impressionism, expressionism, abstract, art deco, etc.), and endless variations of content images (e.g., photographs of people, photographs of landscapes, pencil sketches, paintings, etc.), conventional style transfer techniques have been relatively inaccurate, resulting in noticeable visual artifacts in the generated style-transferred images. Some techniques also require computationally-intensive models in order to handle the vast number of different types of style and content images. Moreover, conventional style transfer techniques did not provide a user with the capability to control or adjust the influence of the style image being applied to the content image, which limited the artistic creativity of content creators.

SUMMARY

Techniques for generating style-transferred images are described herein. In some embodiments, the style of a style image is applied to a content image to generate an initial style-transferred image. The style of the style image encapsulates various stylistics aspects such as an image type (e.g., whether the style image is a color photograph, a black and white photograph, a sketch, etc.), a color scheme associated with the style image, texture of features in the style image, etc. In some embodiments, the initial style-transferred image has the content of the content image (e.g., people, buildings, animals, and/or any other objects) rendered using the style associated with the style image. In some embodiments, the initial style-transferred image is generated using a machine learning model that has been trained to generate a style-transferred image using any style image and any content image (e.g., regardless of the image type associated with the style image and/or the content image, and regardless of content included in the style image and/or the content image).

In some embodiments, the style-transfer techniques allow an initial style-transferred image to be modified using user controls to generate a modified style-transferred image. In one example, the initial style-transferred image is modified to adjust an intensity with which texture associated with the style image is applied in the modified style-transferred image. In another example, the initial style-transferred image is modified to adjust an opacity witch which the style of the style image is applied. In yet another example, the initial style-transferred image is modified to adjust a brush size or stroke size with which the style of the style image is applied. In still another example, the initial style-transferred image is modified to blur a background portion of the initial style-transferred image. In still another example, the initial style-transferred image is modified such that the modified style-transferred image has color values from an original content image. In other words, in some embodiments, the modified style-transferred image retains the color of the original content image but non-color-related style features (e.g., texture) are transferred from the style image. In still another example, the initial style-transferred image is modified such that the style of the style image is applied using a larger brush stroke for foreground objects relative to background objects.

In some embodiments, an initial style-transferred image is generated using a trained machine learning model. The trained machine learning model takes, for example, a style image and a content image as inputs, and multiple sets of style image features and multiple sets of content image features are extracted (e.g., using a feature extraction network, which is referred to as an encoder network in some implementations). In one example, each set of style image features extracted from a layer of the feature extraction network has a corresponding set of content image features extracted from the same layer of the feature extraction network. In some embodiments, corresponding sets of style image features and sets of content image features are merged. For example, a set of style image features is merged with a set of content image features generated by the same layer of a feature extraction network. In some implementations, merging a set of style image features and a set of content image features involves matching and/or aligning standard deviations of the content image features to standard deviations of the style image features and matching and/or aligning means of the content image features to means of the style image features. The merged sets of features are passed to a series of decoder blocks, where a last decoder block in the series of decoder blocks generates, as an output, the initial style-transferred image. In some embodiments, the merged sets of features are passed to a series of residual blocks, and the outputs of the residual blocks are passed to the series of decoder blocks. Use of one or more residual blocks allows the machine learning model to be trained more quickly and/or with higher accuracy by precluding gradients that are too small to generate changes in weights (e.g., the vanishing gradients problem).

In some embodiments, weights associated with the series of decoder blocks and/or the series of residual blocks are determined as part of training the machine learning model, for example, by optimizing a style loss function and a content loss function. In some implementations, the style loss function represents a difference between features extracted from an initial style-transferred image generated by the machine learning model during a training iteration and features extracted from the style image. In some implementations, the content loss function represents a difference between features extracted from the initial style-transferred image generated by the machine learning model during the training iteration and features extracted from the content image.

Details of one or more implementations of the subject matter described in this specification are set forth in the accompanying drawings and the description below. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION OF EMBODIMENTS

Figure 1:
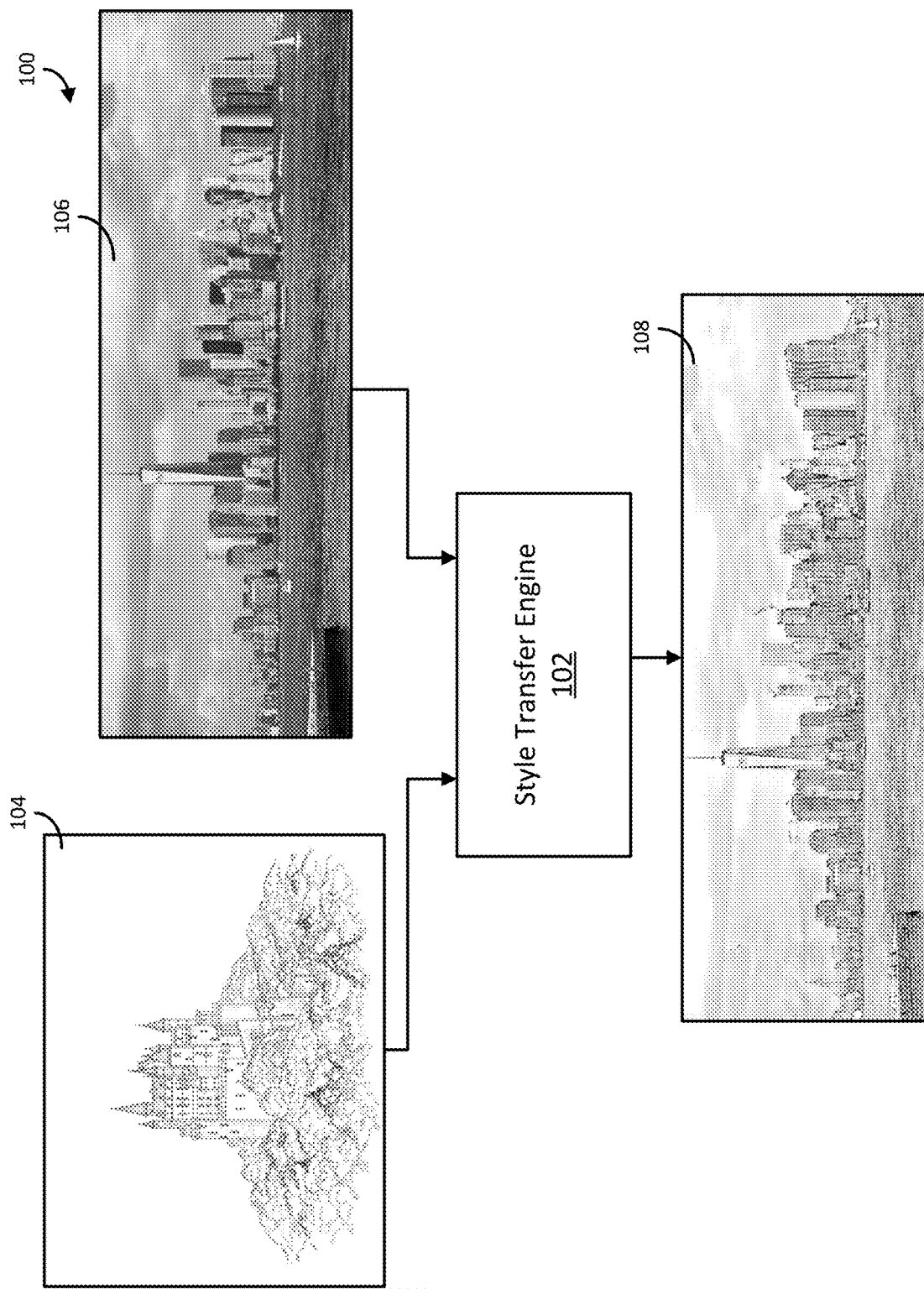
FIG. 1 shows an example of a style-transferred image in accordance with some embodiments.

Disclosed herein are techniques for generating style-transferred images. In some embodiments, an initial style-transferred image is generated using a trained machine learning model that takes, as inputs, a style image and a content image, and that generates the initial style-transferred image by applying a style associated with the style image to content of the content image. In some embodiments, the trained machine learning model extracts sets of features at multiple scales (e.g., from multiple layers of a feature extraction network) from the content image and from the style image, and merges the sets of features. In some embodiments, the merged sets of features are provided to a series of residual blocks. In some embodiments, the initial style-transferred image is generated by a series of decoder blocks. In some embodiments, the initial style-transferred image is modified using one or more user controls that, for example, modify an intensity with which a style is applied to the content image, whether color of the content image is preserved, whether the background of the initial style-transferred image is blurred, or the like.

According to some embodiments, a style-transferred image refers to a generated image in which a style associated with a style image is applied to content of a content image. In some instances, a style image is be associated with a style type, such as a sketch (e.g., a pencil sketch, a line drawing, etc.), a color photograph, a gray-scale photograph, a painting (e.g., a watercolor, an oil painting, etc.), or the like. In some embodiments, a style image has a style that is characterized by a particular color theme (e.g., primarily pastel colors, primarily primary colors, etc.), a manner in which color gradients are present in the style image, line thicknesses, or the like. In some embodiments, features of the style image are then applied to the content of the content image such that the content is rendered in a style associated with the style image. By way of example, in an instance in which a style image is a sketch-style image (e.g., appearing as though sketched by pen, pencil, etc.), and a content image is a photograph, a style transferred image is generated in which the content of the photograph is rendered as if it were sketched using a pen or pencil. In some embodiments, rendering the content image with the style type of the style image involves applying textures of the style image to the content image. As another example, in an instance in which a style image has a particular color theme (e.g., use of pastel colors), a style-transferred image is generated in which the content of the content image is rendered with the color theme of the style image.

It should be noted that, in some instances, a style image and a content image are each associated with different styles and/or different types of content. In one example, a style image is a portrait sketch (e.g., of a person), and a content image is a photograph of a skyline (e.g., including multiple buildings). A resulting style-transferred image for this first example includes the skyline rendered in a sketch style. In another example, a style image is an abstract painting of various geometric shapes with a particular color theme (e.g., bold primary colors), and a content image is a photograph of a person. A resulting style-transferred image for this second example includes the person rendered with the color theme of the abstract painting. It should be noted that in some cases, the style of a style image does not correspond to any specific style category, or is characterized as a combination of different styles. Nevertheless, even in such cases in which the style of a style image is ambiguous or uncertain, style features of the style image are still applied to a content image when using the techniques disclosed herein to generate a style-transferred image.

The techniques described herein provide a machine learning model architecture that generates style-transferred images with relatively higher accuracy and with higher computational efficiency (e.g., less time required to train the machine learning model) than has previously been achieved using conventional techniques. In particular, the architecture described herein uses a feed-forward architecture, which allows for high computational efficiency compared to optimization-based methods. In addition, through the use of merged sets of features (e.g., merged content image features and merged style image features) obtained from multiple (e.g., two or more) layers of a feature extraction network and/or through the use of residual blocks, higher accuracy is achieved relative to other feed-forward based architectures. In one example, a style-transferred image generated by the machine learning model described herein has fewer artifacts relative to style-transferred images of conventional techniques (e.g., content of the content image is reproduced with higher accuracy, textures and/or colors of the original style image are transferred with higher accuracies, etc.

In some embodiments, user-selected controls are used to modify an initial style-transferred image. For example, the initial style-transferred image is generated by applying a style associated with a style image to content of a content image. User controls are then used to modify the initial style-transferred image, for example, to blur a background of the initial style-transferred image, increase focus of foreground objects in the initial style-transferred image, modify the initial style-transferred image to have the colors of the content image, manipulate a texture with which the style of the style image is applied in the initial style-transferred image, or the like.

FIG. 1 shows an example of a style-transferred image generated using the style-transfer techniques described herein, in accordance with some embodiments. As illustrated, a style transfer engine 102 takes, as inputs, a style image 104 and a content image 106, and generates a style-transferred image 108 as the output. Style image 104 and content image 106 are each an image having its own style and content. In the example shown, style image 104 has a sketch-type style and the content includes a castle and trees, and content image 106 has a photograph style and the content includes a city skyline with multiple buildings behind a body of water.

Style transfer engine 102 applies features of the style associated with style image 104 to content of content image 104 to generate style-transferred image 108. For example, as illustrated in FIG. 1, style-transferred image 108 includes the content of content image 106, such as the skyline (e.g., the buildings) and the body of water, but is rendered with a sketch-style associated with style image 104. The sketch-style associated with style image 104 is expressed by the various textures (e.g., textures in the sky portion, textures in the water portion, textures on various building faces, etc.) depicted in style-transferred image 108.

In some embodiments, style transfer engine 102 utilizes a trained machine learning model (e.g., as shown in and described below in connection with FIGS. 3A-3C) that takes, as inputs, style image 104 and content image 106, and generates, as an output, style-transferred image 108 (e.g., as shown in and described below in connection with FIG. 4). In some embodiments, style transfer engine 108 additionally applies one or more user controls that manipulate or modify an initial style-transferred image generated by the machine learning model to apply additional visual effects to the initial style-transferred image. Examples of user interface controls include adjusting an intensity of a texture of a style associated with style image 104, adjusting a focus on foreground objects of the initial style-transferred image, blurring a background of the initial style-transferred image, modifying a brush size with which texture of the style associated with style image 104 is applied, etc. More detailed techniques describing utilization of user controls to manipulate and/or modify an initial style-transferred image are shown in and described below with reference to FIGS. 5-10.

Figure 2:
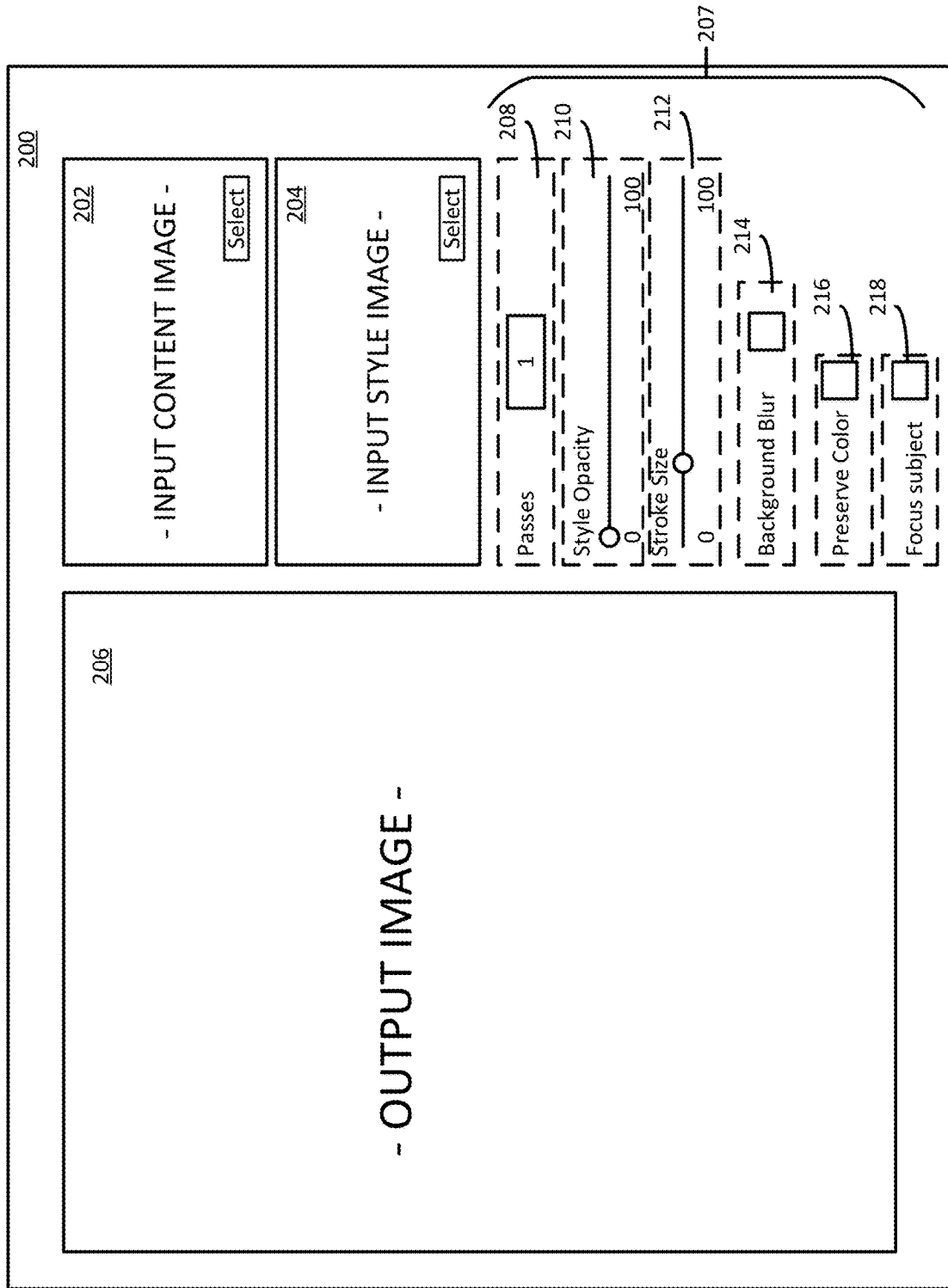
FIG. 2 shows an example user interface for generating and/or modifying a style-transferred image in accordance with some embodiments.

FIG. 2 shows an example of a user interface 200 that allows a user to interact with a style-transfer engine such as style-transfer engine 102 for generating style-transferred images in accordance with some embodiments. In some embodiments, user interface 200 is implemented, for example, using a display or a screen of a computing system such as a computer, a network of computers, a laptop, a tablet, a smart phone, or other types of computing devices/systems. As illustrated, user interface 200 includes a content image selection control 202. In some embodiments, content image selection control 202 is used to select a content image. In one example, the content image is selected from local memory of a device presenting user interface 200. In another example, the content image is selected from a remote device or server, such as a remote storage system, an image provisioning service, a social media service, the Internet, or the like. Additionally, user interface 200 includes a style image selection control 204. In some embodiments, style image selection control 204 is used to select a style image. In one example, the style image is selected from local memory of a device presenting user interface 200. In another example, the content image is selected from a remote device or server, such as a remote storage system, an imaging provisioning service, a social media service, the Internet, or the like.

In some embodiments, features of a style associated with a style image selected using style image selection tool 204 are applied to the content of a content image selected using content image selection tool 202 to generate an initial style-transferred image. In some embodiments, the initial style-transferred image is presented in output image display area 206.

As illustrated, user interface 200 includes user controls 207. In some embodiments, controls included in user controls 207 are used to manipulate the initial style-transferred image. For example, in some embodiments, a texture control 208 is used to manipulate an intensity of the texture of the style image being applied to the content image. In some implementations, texture control 208 allows a user to enter the number of times (e.g., number of passes) the content image is processed through a trained machine learning model that applies the style associated with the style image to the content image. An increased number of passes corresponds to an increase in the intensity of a texture of the style image in the resulting style-transferred image. More detailed techniques for manipulating the intensity of the texture of the style image are shown in and described below in connection with FIG. 5.

As another example, in some embodiments, a style opacity control 210 is used to manipulate an intensity of application of the style of the style image to an initial style-transferred image. In some implementations, style opacity control 210 allows a user to select a level at which a content image is blended with the initial style-transferred image. A higher level of blending corresponds to a lower opacity of the style of the style image, because a higher degree of the content image is blended with the initial style-transferred image. In other words, a higher level of blending results in dilution of applying the style of the style image to the content image. More detailed techniques for manipulating the intensity of application of the style of the style image are shown in and described below in connection with FIG. 6.

As yet another example, in some embodiments, a stroke size control 212 is used to manipulate a size of a brush stroke used to apply the style of the style image. In some implementations, stroke size control 212 allows a user to select the size of the brush stroke (e.g., using a slider control). In some embodiments, a larger value corresponds to a larger brush size, which in turn makes texture appear to be applied using a broader stroke. More detailed techniques for manipulating the size of the brush stroke are shown in and described below in connection with FIG. 7.

As still another example, in some embodiments, a background blur control 214 allows a user to control whether or not a background portion of the style-transferred image is blurred. More detailed techniques for manipulating a degree to which the background of the initial style-transferred image is blurred are shown in and described below in connection with FIG. 8.

As still another example, in some embodiments. a preserve color control 216 allows a user to indicate that the color of pixels of the content image is to be preserved in the style-transferred image. For example, in an instance in which pixels of the content image has particular a and b color values (e.g., representing values on a red-green axis and a blue-yellow axis, respectively), the pixels in the corresponding style-transferred image also has the same or similar a and b color values, regardless of the colors of the style image. Despite retaining the color scheme of the content image, various features of the style of the style image (e.g., texture, etc.) are still applied to the content image in the style-transferred image. More detailed techniques for preserving color information of a content image are shown in and described below in connection with FIG. 9.

As still another example, in some embodiments, a focus subject control 218 allows a user to indicate that foreground objects in the content image are to be focused in the style-transferred image. In some implementations, a focusing effect is achieved by applying the style of the style image using larger brush strokes for a foreground portion of the content image relative to the brush strokes used to apply the style of the style image to background portion of the content image. More detailed techniques for manipulating focus of foreground objects are shown in and described below in connection with FIG. 10.

In some embodiments, as user controls 208-218 receive user input to enable or provide values for adjusting the various modifications, the initial style-transferred image is modified or manipulated accordingly. In one example, the initial style-transferred image is generated without any blurring of the background, and in response to determining that the checkbox associated with background blur control 214 has been selected to enable background blurring, the background of the initial style-transferred image is blurred to generate a modified style-transferred image. In some embodiments, the modified style-transferred image is presented in output image display area 206. In some implementations, the style-transferred image presented in output image display area 206 is continually updated in real time to reflect the user input received via user controls 207.

In some embodiments, an initial style-transferred image is generated using a trained machine learning model. The trained machine learning model, according to some implementations, includes a content image feature extractor and a style image feature extractor. The content image feature extractor and the style image feature extractor take as inputs the content image and the style image, respectively. The content image feature extractor and the style image feature extractor each generate multiple sets of features. In one example, each feature extractor is a convolutional neural network (CNN) that includes multiple layers (e.g., encoder layers), and each set of features extracted corresponds to one of the layers of the CNN. In one example, the feature extractor (e.g., the content image feature extractor and/or the style image feature extractor) generates 4 sets of features corresponding to 4 different layers of the feature extractor. The sets of features corresponding to the content image feature extractor are generally referred to herein as ($C_1$, $C_2$, ... $C_N$), and the sets of features corresponding to the style image feature extractor are generally referred to herein as ($S_1$, $S_2$, ... $S_N$). In one example, each feature extractor is a Visual Geometry Group (VGG) neural network (e.g., VGG-16, VGG-19, etc.). In some embodiments, each set of features (e.g., $C_1$, $C_2$, ... $C_N$ and $S_1$, $S_2$, ... $S_N$) are an output of an activation function layer (e.g., a rectified linear unit (ReLU) function). In some implementations, each set of features are an output of an activation function layer that operates at a different pixel scale in the VGG. In one example, $C_1$ and $S_1$ is the output of an activation function layer that operates at 224×224 pixel scale, $C_2$ and $S_2$ is the output of an activation function layer that operates at 112×112 pixel scale; $C_3$ and $S_3$ is the output of an activation function layer that operates at 56×56 pixel scale; and so on. Accordingly, the style-transferred techniques utilize feature transform at multiple pixel scales. In some embodiments, each feature extractor is pre-trained using any suitable image dataset.

In some embodiments, transfer of features of the style image to the content image is performed at least in part by merging a set of features generated by the style image feature extractor with a corresponding set of features generated by the content image feature extractor, where each set of features was generated by the same layer of the feature extractor. For example, a set of content image features generated by the first layer of the content image feature extractor ($C_1$) is merged with a set of style image features generated by the first layer of the style image feature extractor ($S_1$). In some embodiments, merging sets of features is performed using an adaptive instance normalization technique, generally referred to herein as "AdaIN." In one example, a mean and variance of a set of content image features are aligned to match the mean and variance of a corresponding (e.g., from the same layer of the feature extractor network) set of style image features. More particularly, in this example, the set of content image features is scaled by the standard deviation of the set of style image features and shifted by the mean of the set of style image features. An example equation for performing the adaptive instance normalization technique, for a set of content image features C and a set of style image features S, is:

$$AdaIN(C, S) = \sigma(S)\left(\frac{C - \mu(C)}{\sigma(C)}\right) + \mu(S)$$

In some embodiments, each merged set of features (e.g., content image features and style image features merged from corresponding layers of the content image feature extractor and the style image feature extractor, respectively) is passed to a series of decoder blocks. In some embodiments, the number of decoder blocks corresponds to the number of sets of merged features. Therefore, in some such embodiments, the number of decoder blocks corresponds to the number of layers from which extracted features obtained from the content image feature extractor and the style image feature extractor are merged. By way of example, in a particular implementation, four corresponding sets of features obtained from four respective layers of the feature extractors (e.g., $C_1$ and $S_1$ from layer A, $C_2$ and $S_2$ from layer B, $C_3$ and $S_3$ from layer C, and $C_4$ and $S_4$ from layer D) are used, and thus four decoder blocks are used. The decoder blocks generate an output image, generally referred to herein as the initial style-transferred image. In some embodiments, prior to being passed to the series of decoder blocks, each merged set of features is passed to a residual block. For example, a residual block includes a skip connection that allows information from lower level layers to be passed to higher level layers. Example techniques for implementing residual blocks include ResNet, ResNext, or the like. In some instances, use of residual blocks allows the machine learning model to be trained more quickly and more accurately (e.g., by precluding the formation of small gradients which do not yield changes in weights of various networks).

Weights associated with the series of decoder blocks and/or one or more residual blocks are determined by optimizing a style loss function or term (referred to herein as "$L_S$") and a content loss function or term (referred to herein as "$L_C$"). Each loss term is determined by extracting, for an output image O, a set of features (e.g., $O_1, O_2, \ldots O_N$). In some embodiments, the same feature extractor is used as the content image feature extractor and the style image feature extractor. In one example, a VGG network is used, wherein $O_1, O_2, \ldots O_N$ correspond to outputs of the ReLU activation function at each layer $1, 2, \ldots N$. In some embodiments, the content loss term $L_C$ depends on the features associated with the deepest level layer (e.g., $O_N$). In some embodiments, the style loss term depends on the features associated with each of the layers (e.g., $O_1, O_2, \ldots O_N$). In some embodiments, the content loss term ($L_C$) is an $L_2$ difference between the features of content image at one layer (e.g., the deepest level layer, $C_N$) and the features of the output image at the one layer (e.g., $O_N$). An example equation for $L_C$ in an instance in which each feature extraction network uses the outputs of 4 layers is:

$$L_C = \|O_4 - C_4\|_2$$

In some embodiments, the style loss term ($L_S$) is a sum of $L_2$ differences between the gram matrices of the features of the style image at a particular layer and the features of the output image at the same layer. An example equation for $L_S$ in an instance in which each feature extraction network uses the outputs of 4 layers is:

$$L_S = \Sigma_{i=1}^{4} \|g(O_i) - g(S_i)\|_2, \text{ where } g(x) = x^T x$$

Figure 3A:
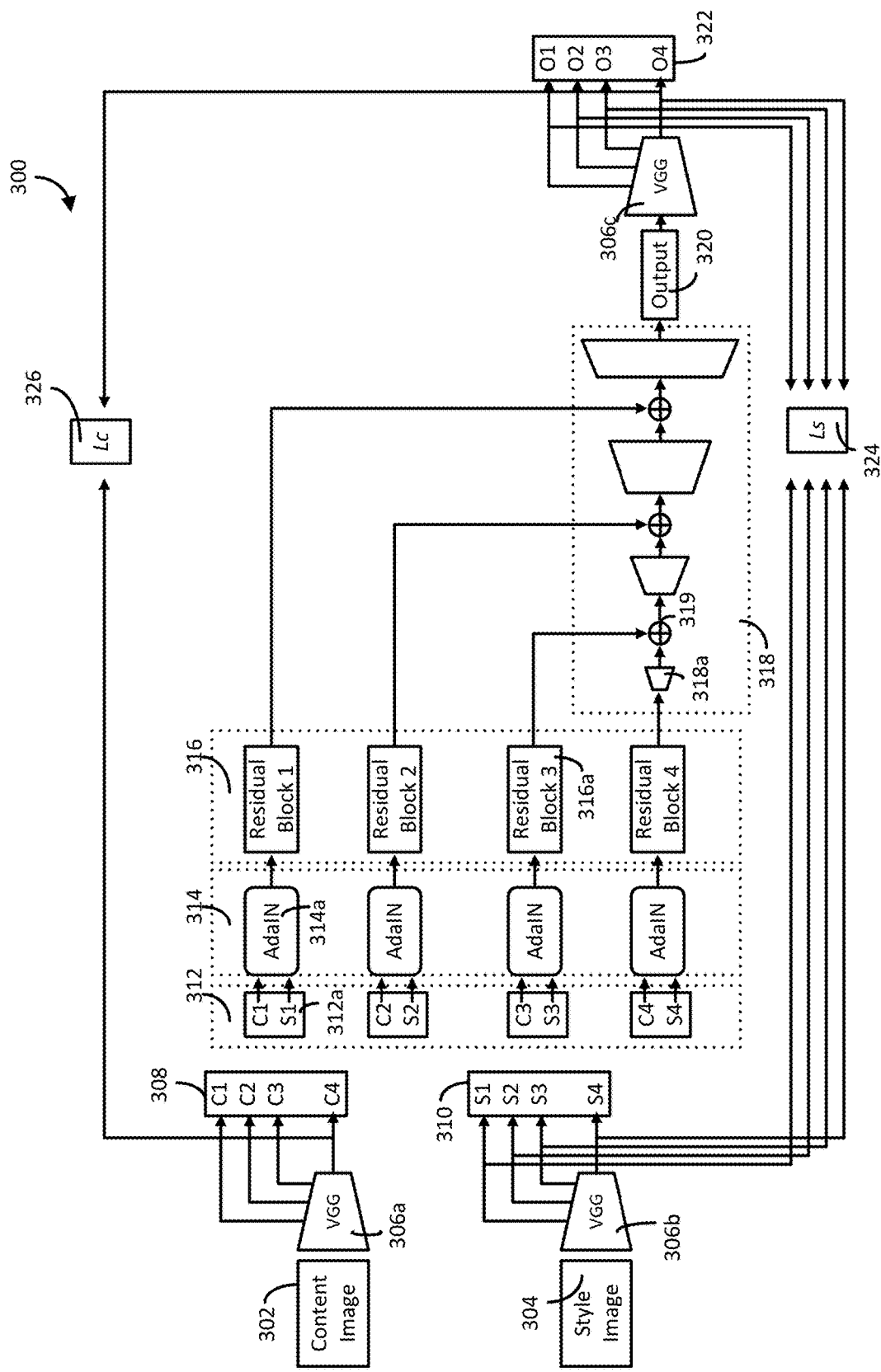
FIGS. 3A-3C show example architectures for components of a machine learning model for generating style-transferred images.

FIG. 3A shows an example 300 of a machine learning model for generating an initial style-transferred image in accordance with some embodiments. As illustrated, a content image 302 is provided as an input to a content image feature extractor 306a, and a style image 304 is provided to a style image feature extractor 306b. In some embodiments, content image feature extractor 306a and style image feature extractor 306b uses the same feature extraction network (e.g., the same VGG network trained on the same training set). Content image feature extractor 306a generates multiple sets of content image features 308, where each set of content image features corresponds to a layer of content image feature extractor 306a. For example, as illustrated in FIG. 3A, the multiple sets of content image features include sets of content image features $C_1, C_2, C_3$, and $C_4$. Similarly, style image feature extractor generates multiple sets of style image features 310, where each set of style image features corresponds to a layer of style image feature extractor 306b. For example, as illustrated in FIG. 3A, the multiple sets of style image features include sets of style image features $S_1, S_2, S_3$, and $S_4$.

For sets of features corresponding to the same layer (e.g., $C_1$ and $S_1$, $C_2$ and $S_2$, etc.), the set of content image features is merged with the corresponding set of style image features. For example, as illustrated in FIG. 3A, matched sets of features 312 shows a set of content image features matched with a corresponding set of style image features generated by the same layer of the respective feature extraction network. The sets of features are then merged using adaptive instance normalization blocks 314. For example, adaptive instance normalization block 314a merges matched set of features 312a corresponding to $C_1$ and $S_1$.

Each merged set of features is then passed to a corresponding series of residual blocks 316. The outputs of series of residual blocks 316 is passed to a series of decoder blocks 318. In some embodiments, an output of a decoder block is combined with an output of a residual block by adding the output of the residual block to the output of the decoder block for each channel. For example, an output of residual block 316a is combined at 319 with an output of decoder block 318a. Note that a more detailed architecture of a residual block is shown in and described below in connection with FIG. 3B and a more detailed architecture of a decoder block is shown in and described below in connection with FIG. 3C.

Series of decoders blocks 318 generates an output image 320, generally referred to herein as an initial style-transferred image. During training of the machine learning model (e.g., to determine weights associated with series of decoders 318 and/or series of residual blocks 316), output image 320 is provided as an input to feature extractor 306c. It should be noted that, in some embodiments, feature extractor 306c is the same feature extraction network as content image feature extractor 306a and/or style image feature extractor 306b. Feature extractor 306c generates a set of features 322 associated with output image 320. The set of features 322 is used to generate a style loss function 324 and a content loss function 326, as described above. It should be noted that during inference time (after training of the machine learning model), feature extractor 306c is omitted.

Figure 3B:
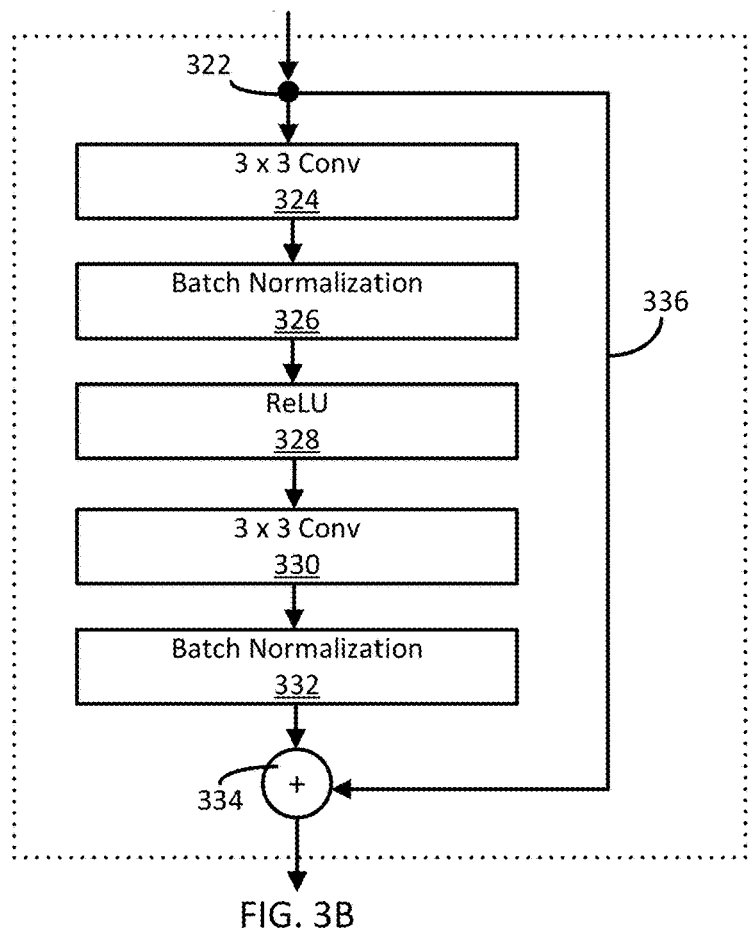

FIG. 3B shows an example architecture of a residual block. In some embodiments, each residual block receives, as an input, a set of merged features 332. Set of merged features is passed to a convolution block 324. In the example shown in FIG. 3B, convolution block 324 is a convolution block that uses 3×3 filters. It should be noted that although 3×3 filters are shown in FIG. 3B, in some embodiments, filters of other sizes (e.g., 4×4, 5×5, or the like) are used. The output of convolution block 324 is passed to a batch normalization block 326. The output of batch normalization block 326 is passed to an activation function 328. In the example shown in FIG. 3B, activation function 328 is a ReLU function. The output of activation function 328 is passed to a second convolution block 330. In the example shown in FIG. 3B, second convolution block 330 is a convolution block that uses 3×3 filters. The output of second convolution block 330 is passed to a second batch normalization block 332. The output of second batch normalization block 332 is combined at 334 with the input set of merged features, which is passed via a skip connection 336. It should be noted that although FIG. 3B depicts a residual block implemented as a ResNet, other implementations of residual blocks are contemplated, such as a ResNext network, or the like.

Figure 3C:
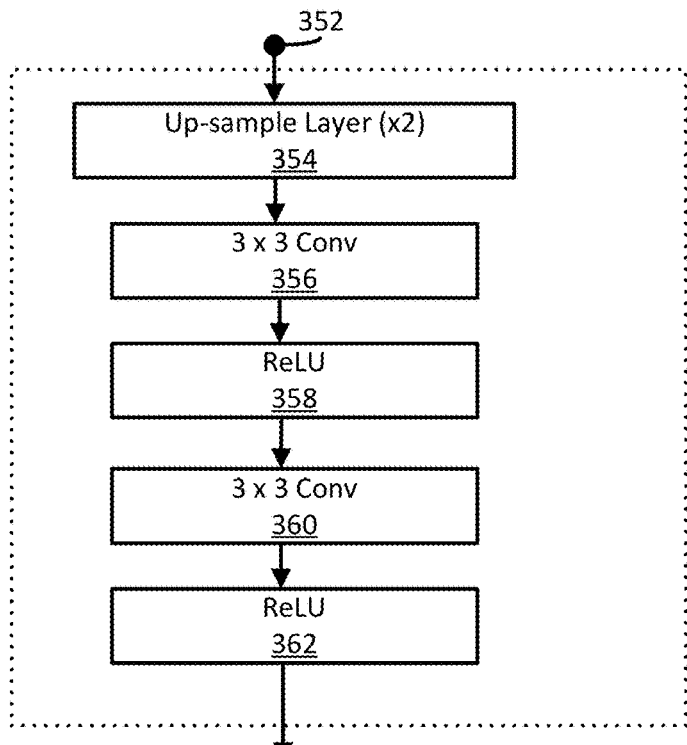

FIG. 3C shows an example architecture of a decoder block. In some embodiments, the decoder block receives an input 352. In one example, input 352 is an output of a previous decoder block. In another example, input 352 is an output of a residual block. Input 352 is passed to one or more up-sampling blocks 354. In the example shown in FIG. 3C, two up-sampling blocks are used. The output of up-sampling blocks 354 is passed to a convolution block 356. In the example shown in FIG. 3C, convolution block 356 is a convolution block that uses 3×3 filters. It should be noted that although 3×3 filters are shown in FIG. 3C, in some embodiments, filters of other sizes (e.g., 4×4, 5×5, or the like) are used. The output of convolution block 356 is passed to an activation function 358. In the example shown in FIG. 3C, activation function 358 is a ReLU function. The output of activation function 358 is passed to a second convolution block 360. In the example shown in FIG. 3C, second convolution block 360 is a convolution block that uses 3×3 filters. The output of second convolution block 360 is passed to a second activation function 362. In the example shown in FIG. 3C, second activation function 362 is a ReLU function.

It should be noted that, in some embodiments, a machine learning model for generating an initial style-transferred image is trained on a server (e.g., implemented as a server computer, network connected computers, etc.). For example, the server applies a training set of style images and content images to the machine learning model and determines weights associated with one or more decoder blocks and/or one or more residual blocks based at least in part on the content loss function and/or the style loss function described above. In some embodiments, parameters (e.g., weights) associated with the trained machine learning model are provided to a user device, which then uses the parameters (e.g., weights) associated with the trained machine learning model to generate an initial style-transferred image using a style image and a content image. In some implementations, the style image and/or the content image is not included in the training set used by the server to train the machine learning model. Alternatively, in some implementations, the style image and/or the content image are included in the training set used by the server to train the machine learning model.

Figure 4:
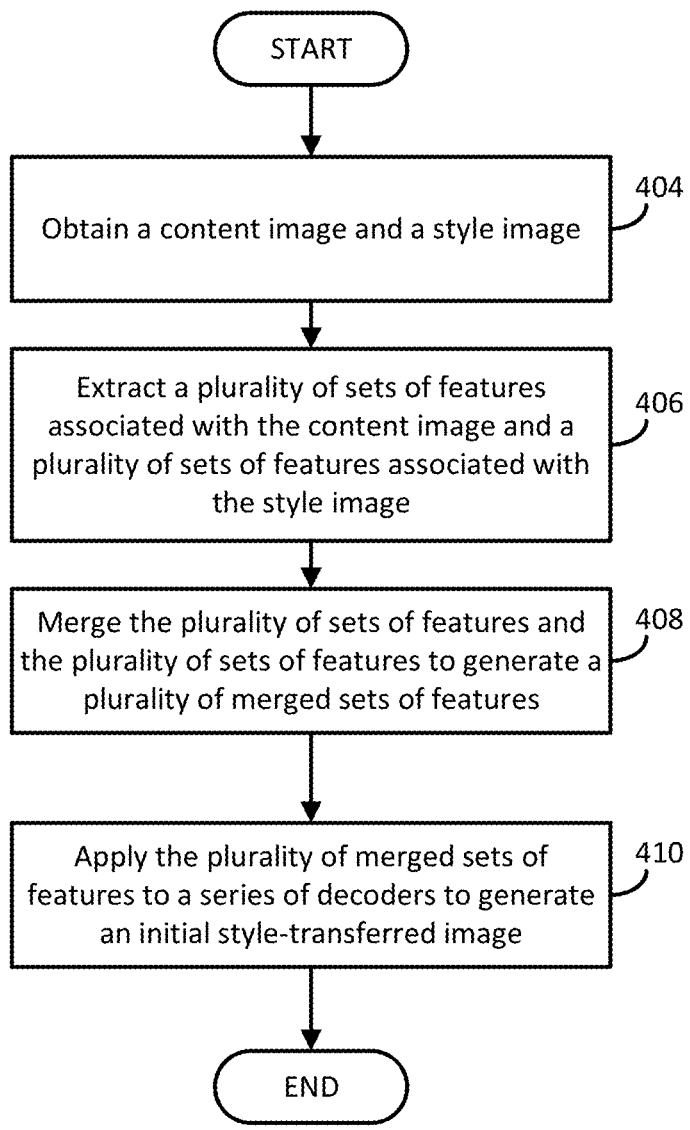
FIG. 4 shows an example process for generating a style-transferred image in accordance with some embodiments.

FIG. 4 shows an example of a process 400 for generating an initial style-transferred image using a trained machine learning model. In some embodiments, blocks of process 400 are executed by a user device. In some embodiments, blocks of process 400 are performed in a different order than the sequence shown in FIG. 4. In some embodiments, two or more blocks of process 400 are performed substantially in parallel, two or more blocks of process 400 are combined into a single block. In some embodiments, one or more blocks of process 400 are split up into multiple blocks.

Process 400 begins at block 404 by obtaining a content image and a style image. As described above in connection with FIG. 1, the content image and the style image each have various content (e.g., people, animals, buildings, plants, and/or any other suitable objects). In some embodiments, the content image and the style image are different types of images. Examples of different types of images include color photographs, black and white photographs, paintings, sketches, or the like. As described above in connection with FIG. 2, in some embodiments, the content image and the style image are obtained via a user interface.

At block 406, process 400 extracts a plurality of sets of features associated with the content image using a content image feature extractor and a plurality of sets of features associated with the style image using a style image feature extractor. The plurality of sets of features are extracted by applying each of the style image and the content image to an encoder network. In some embodiments, each set of features corresponds to a different layer of the feature extractor. For example, a first set of features associated with the content image corresponds to a first layer of the content image feature extractor, and a second set of features associated with the content image corresponds to a second layer of the content image feature extractor. In one example, features extracted from four of the layers of each feature extractors are used. In some embodiments, each feature extractor is a VGG network.

At block 408, process 400 merges the plurality of sets of features associated with the content image with the plurality of sets of features associated with the style image to generate a plurality of merged sets of features. In some embodiments, sets of features generated by the same layer of a feature extractor are merged. For example, a first set of features generated by a first layer of the content image feature extractor is merged with a first set of features generated by a first layer of the style image feature extractor such that each merged set of features corresponds to one of a plurality of layers of the encoder network to which the content image and the style image were applied as described above with reference to block 406. In some embodiments, merging a set of content image features with a set of style image features involves aligning a mean and a variance of the set of content image features with a mean and a variance of the set of style image features. In one example, a set of content image features is merged with a set of style image features using the AdaIN technique.

At block 410, process 400 applies the plurality of merged sets of features to a series of decoders (sometimes referred to herein as a "decoder network") to generate an initial style-transferred image. In some embodiments, the initial style-transferred image is an output of a final decoder in the series of decoders. In some embodiments, the plurality of merged sets of features is passed to a series of residual blocks, where outputs of the series of residual blocks are used by the series of decoders. In some implementations, the series of decoders (e.g., the decoder network) combines modified merged sets of features generated by the series of residual blocks to generate the initial style-transferred image.

FIGS. 5-10 show examples of processes for modifying an initial style-transferred image (e.g., an initial style-transferred image generated by process 400) using user controls. Modification of an initial style-transferred image generates a modified style-transferred image. In some embodiments, the user controls are presented on a user interface. In some implementations, the user controls are accessed via a graphical user interface and/or a text-based user interface such as a command prompt or via a scripting tool. Examples of user controls for modifying an initial style-transferred image are shown in and described above in connection with FIG. 2. In some embodiments, manipulation of a user control shown in FIG. 2 causes a corresponding process of FIGS. 5-10 to be executed to achieve the corresponding modification of the initial style-transferred image. In some implementations, the initial style-transferred image is generating using a machine learning model (e.g., the machine learning model shown in and described above in connection with FIGS. 3A-3C). Although each of the user controls corresponding to FIGS. 5-10 is described separately, it should be understood that, in some implementations, a modified style-transferred image includes modifications resulting from a combination of two or more of the processes depicted in FIGS. 5-10.

Figure 5:
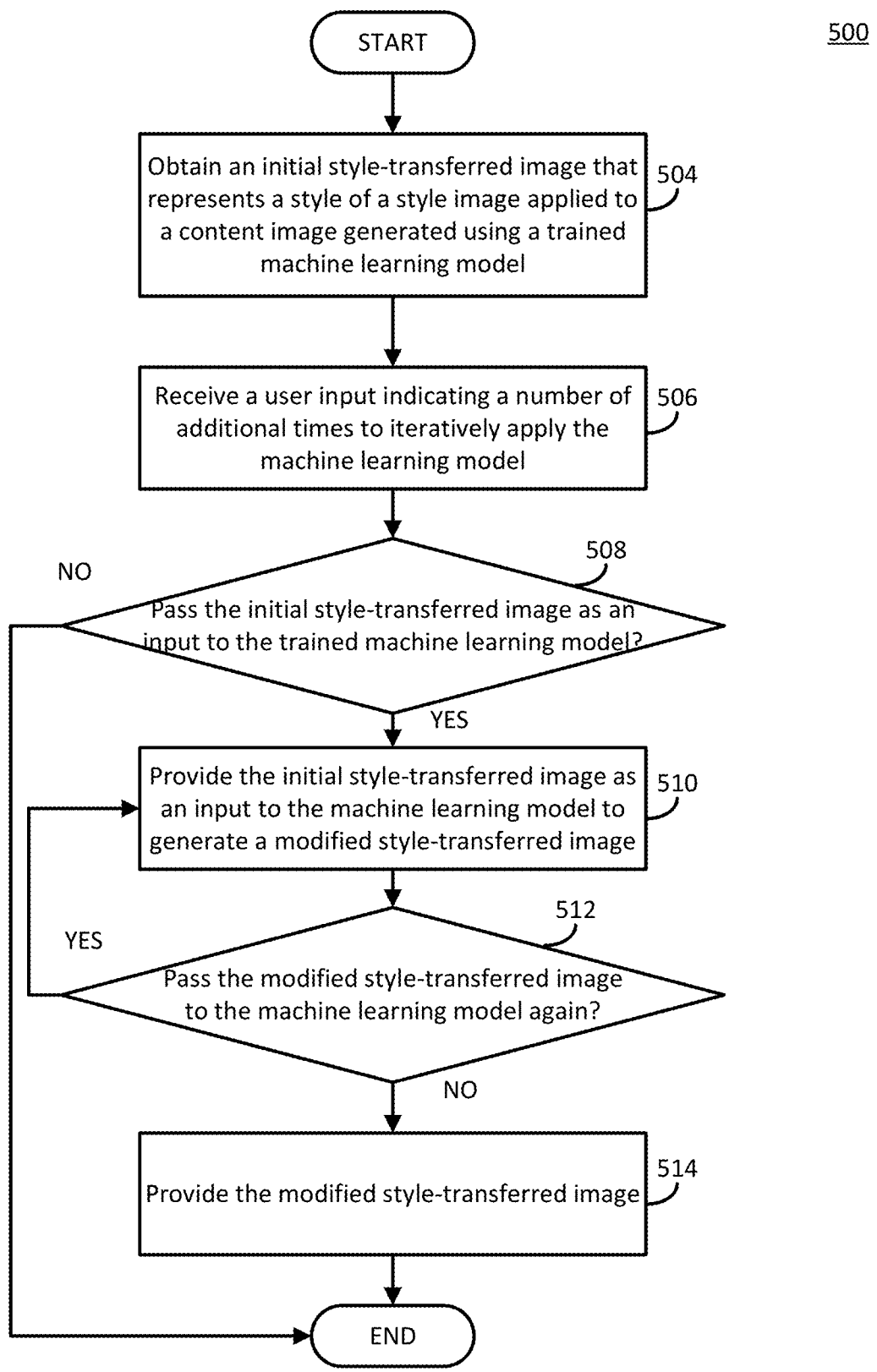
FIG. 5 shows an example process for adjusting an intensity of texture in accordance with some embodiments.

FIG. 5 shows an example of a process 500 for controlling a degree to which texture of a style associated with a style image is applied in a resulting style-transferred image. In some embodiments, blocks of process 500 are executed by a user device or by a computing system that is accessed via a user device. In some embodiments, blocks of process 500 are performed in an order other than what is shown in FIG. 5. In some embodiments, two or more blocks of process 500 are performed substantially in parallel.

Process 500 begins at block 504 by obtaining an initial style-transferred image that represents a style associated with a style image applied to a content image generated using a trained machine learning model. In one example, the initial style-transferred image is generated by process 400 as shown in and described above in connection with FIG. 4.

At block 506, process 500 receives user input indicating a number of additional times (e.g., texture level) to apply the initial style-transferred image to the machine learning model. In some embodiments, the number of additional times is constrained by a maximum possible value (e.g., 5, 10, or the like). In one example, the number of additional times is an integer value between and the maximum possible value. In some embodiments, the user input is received via a user interface, such as the user interface shown in and described above in connection with FIG. 2.

At block 508, process 500 determines whether to pass the initial style-transferred image as an input to the trained machine learning model. For example, in an instance in which the user input received at block 506 indicates that the number of additional times to apply the initial style-transferred image to the trained machine learning model is 0, process 500 determines that the initial style-transferred image is not to be used as an input to the trained machine learning model ("no" at block 508). As another example, in an instance in which the user input received at block 506 indicates that the number of additional times to apply the initial style-transferred image to the trained machine learning model is greater than 0 (e.g., 1, 2, 5, or the like), process 500 determines that the initial style-transferred image is to be used as an input to the trained machine learning model ("yes" at block 508).

If, at block 508, process 500 determines that the initial style-transferred image is not to be used as an input to the trained machine learning model ("no" at block 508), process 500 ends at block 514. Conversely, if, at block 508, process 500 determines that the initial style-transferred image is to be used as an input to the trained machine learning model ("yes" at block 508), process 500 provides the initial style-transferred image as an input to the trained machine learning model at block 510 to generate a modified style-transferred image. In some embodiments, the trained machine learning model takes, as an input, the initial style-transferred image in lieu of the content image. In other words, the trained machine learning model takes, as inputs, the style image and the initial style-transferred image, and the style of the style image is applied to the initial style-transferred image to generate, as an output, the modified style-transferred image.

At block 512, process 500 determines whether to pass the modified style-transferred image to the trained machine learning model again. In some embodiments, process 500 determines whether to pass the modified style-transferred image to the trained machine learning model again based on a comparison of the additional number of times to apply the trained machine learning model as indicated by the user input received at block 506 to a number of additional passes that have already been performed process 500. For example, process 500 determines the modified style-transferred image is not to be passed to the trained machine learning model again ("no" at block 512) in response to determining that the number of additional passes that have already been performed meets the additional number of times to apply the trained machine learning model as indicated by the user input received at block 506. As another example, process 500 determines the modified style-transferred image is to be passed to the trained machine learning model again ("yes" at block 512) in response to determining that the number of additional passes that have already been performed is less than the additional number of times to apply the trained machine learning model as indicated by the user input received at block 506.

If, at block 512, process 500 determines that the modified style-transferred image is to be passed to the trained machine learning model again ("yes" at block 512), process 500 loops back to block 510 and provides the modified style-transferred image as an input to the trained machine learning model. In some embodiments, process 500 takes, as inputs, the style image and the modified style-transferred image to generate, as an output, a second modified style-transferred image. Process 500 loops through blocks 510 and 512 until the number of additional times to iteratively apply the trained machine learning model as indicated by the user input received at block 506 has been reached If, at 512, process 500 determines that the modified style-transferred image is not to be passed to the trained machine learning model ("no" at 512), process 500 provides the modified style-transferred image at 514. Accordingly, generating the modified style-transferred image using the manner described above includes executing the machine learning model for a predetermined number of iterations corresponding to the texture level provided by the user, and each iteration provides an output image used as an input content image for a next iteration. In some embodiments, process 500 causes the modified style transferred image to be presented, for example, on a display of a user device executing process 500. In such embodiments, the modified style-transferred image is presented via a user interface, such as the user interface shown in and described above in connection with FIG. 2. In some embodiments, process 500 causes the modified style-transferred image to be saved, for example, in local memory of a user device executing process 500, in memory associated with a cloud-service, or the like.

Figure 6:
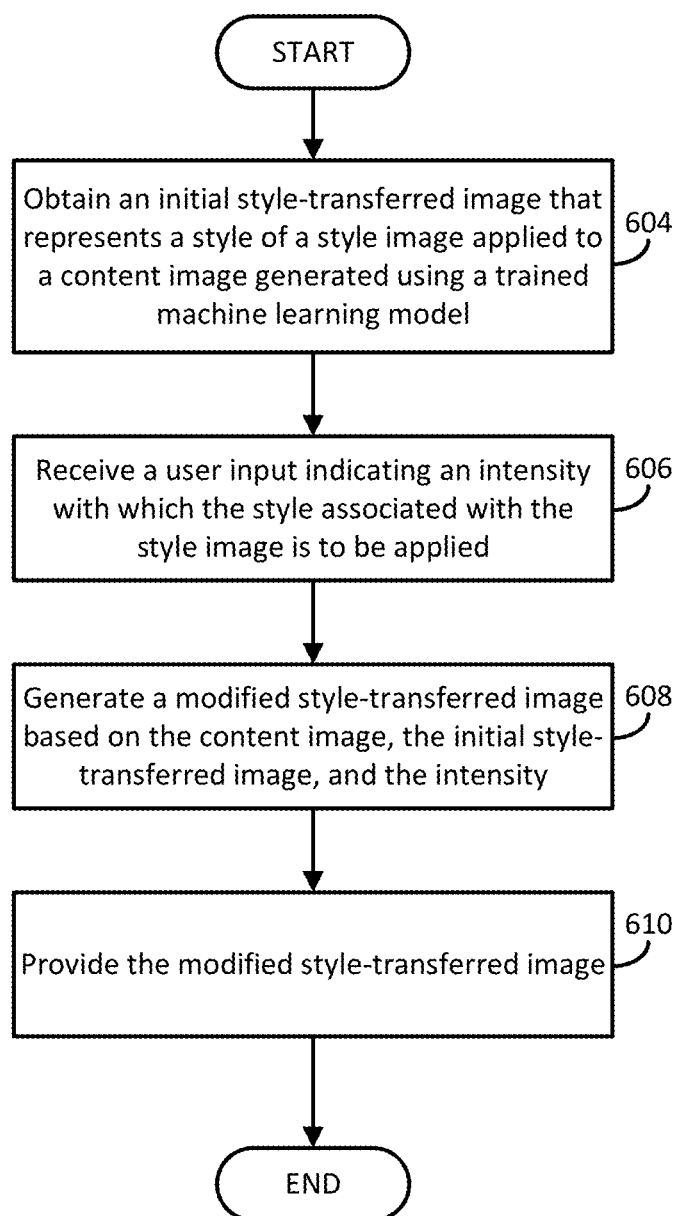
FIG. 6 shows an example process for adjusting an intensity of a style associated with a style image applied to a content image in accordance with some embodiments.

FIG. 6 shows an example of a process 600 for controlling a style opacity with which a style associated with a style image is applied. In some embodiments, blocks of process 600 are executed by a user device. In some embodiments, blocks of process 600 are performed in an order other than what is shown in FIG. 6. In some embodiments, two or more blocks or process 600 are performed substantially in parallel.

Process 600 begins at block 604 by obtaining an initial style-transferred image that represents a style associated with a style image applied to a content image generated using a trained machine learning model. In one example, the initial style-transferred image is generated by process 400 as shown in and described above in connection with FIG. 4.

At block 606, process 600 receives user input indicating an intensity and/or opacity with which features associated with the style image are to be applied. In some embodiments, the user input is a value within a predetermined range (e.g., a numeric value between 0 and 1, a numeric value between 0 and 100, or the like). In some embodiments, the value indicates a degree to which the original content image is to be blended with the initial style-transferred image, where a higher degree of blending of the original content image corresponds to a lower opacity of application of the style. In one example, a value at the lower end of the predetermined range (e.g., 0) indicates that the original content image is not to be blended at all, whereas a value at the higher end of the predetermined range indicates that the original content image is to be blended with the initial style-transferred image to a higher degree. In some embodiments, the user input is received via a user interface, such as the user interface shown in and described above in connection with FIG. 2.

At block 608, process 600 generates a modified style-transferred image based on the content image and the initial style-transferred image obtained at block 604. For example, in some embodiments, process 600 blends the content image with the initial style-transferred image by calculating a weighted sum of the content image and the initial style-transferred image, where the weights associated with the weighted sum are determined by the user input received at block 606. In one example in which the user input is a value a between 0 and 1, an equation for generating the modified style-transferred image (referred to herein as $I_{modified}$) is given by:

$$I_{modified} = \alpha I_{content} + (1-\alpha) I_{initial}$$

In the equation given above, $I_{content}$ represents the original content image, and $I_{initial}$ represents the initial style-transferred image. It should be noted that, in some embodiments, in an instance in which $\alpha=1$, the modified style-transferred image is the original content image (e.g., style associated with the style image is not transferred). In some implementations in which the user input is a value between 0 and 100, the user input value is scaled to the range of $\alpha$ such that a user input value of 0 corresponds to $\alpha=0$ and a user input value of 100 corresponds to $\alpha=1$.

At block 610, process 600 provides the modified style-transferred image. In some embodiments, process 600 causes the modified style transferred image to be presented, for example, on a display of a user device executing process 600. In some such embodiments, the modified style-transferred image is presented via a user interface, such as the user interface shown in and described above in connection with FIG. 2. In some embodiments, process 600 causes the modified style-transferred image to be saved, for example, in local memory of a user device executing process 600, in memory associated with a cloud-service, or the like.

Figure 7:
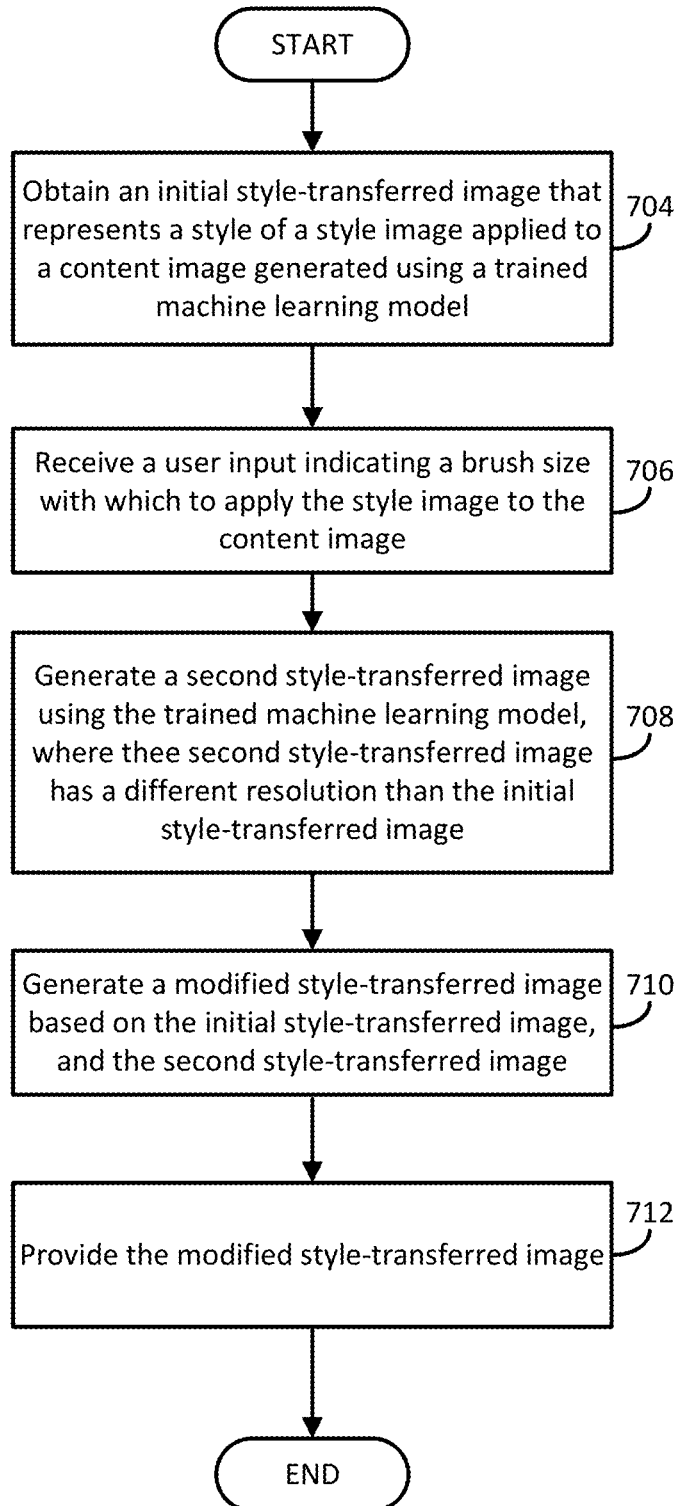
FIG. 7 shows an example process for modifying a brush size used to apply style associated with a style image in accordance with some embodiments.

FIG. 7 shows an example of a process 700 for controlling a brush size or a stroke size with which a style associated with a style image is applied. In some embodiments, use of a larger brush size to modify an initial style-transferred image causes texture of the initial style-transferred image (e.g., that has been generated due to the style associated with a style image) to appear to be applied with a larger sized brush. In some embodiments, blocks of process 700 are executed by a user device. In some embodiments, blocks of process 700 are performed other than in an order shown in FIG. 7. In some embodiments, two or more blocks of process 700 are performed substantially in parallel.

Process 700 begins at bock 704 by obtaining an initial style-transferred image that represents a style associated with a style image applied to a content image generated using a trained machine learning model. In one example, the initial style-transferred image is generated by process 400 as shown in and described above in connection with FIG. 4.

At block 706, process 700 receives user input indicating a brush size with which the features of the style image is to be applied. In some embodiments, the user input is a value within a predetermined range (e.g., a numeric value between 0 and 1, a numeric value between 0 and 100, or the like). In one example, a larger value as indicated in the user input correlates with a larger brush size and, conversely, a smaller value as indicated in the user input correlates with a smaller brush size. In some embodiments, the user input is received via a user interface, such as the user interface shown in and described above in connection with FIG. 2.

At block 708, process 700 generates a second style-transferred image using the trained machine learning model, where the second style-transferred image has a different resolution than the initial style-transferred image. In one example, the second style-transferred image has a higher resolution than the initial style-transferred image. In another example, the second style-transferred image has a lower resolution than the initial style-transferred image. In some implementations, process 700 selects the resolution of the second style-transferred image based at least in part on the user input that indicates the brush size (e.g., as received at block 706). For example, in an instance in which the user input indicates that the brush size is to be relatively large, process 700 selects a resolution that is lower than the resolution of the initial style-transferred image. As another example, in an instance in which the user input indicates that the brush size is to be relatively small, process 700 selects a resolution that is higher than the resolution of the initial style-transferred image. In some implementations, process 700 generates the second style-transferred image by providing a content image having the selected resolution to the trained machine learning model, where the trained machine learning model generates the second style-transferred image having the selected resolution (e.g., using process 400, as shown in and described above in connection with FIG. 4).

At block 710, process 700 generates a modified style-transferred image based at least in part on the initial style-transferred image obtained at block 704 and second style-transferred image generated at block 708. In some embodiments, process 700 generates the modified style-transferred image by using Laplacian pyramid blending to combine the initial style-transferred image with the second style-transferred image. Techniques for performing Laplacian blending are described in Burt, P. J. & Adelson, E. H. (1983, April); The Laplacian Pyramid as a Compact Image Code; IEEE Transactions on Communications, 31(4), pages. 532-540, which is hereby incorporated by reference herein in its entirety.

At block 712, process 700 provides the modified style-transferred image. In some embodiments, process 700 causes the modified style transferred image to be presented, for example, on a display of a user device executing process 700. In some such embodiments, the modified style-transferred image is presented via a user interface, such as the user interface shown in and described above in connection with FIG. 2. In some embodiments, process 700 causes the modified style-transferred image to be saved, for example, in local memory of a user device executing process 700, in memory associated with a cloud-service, or the like.

Figure 8:
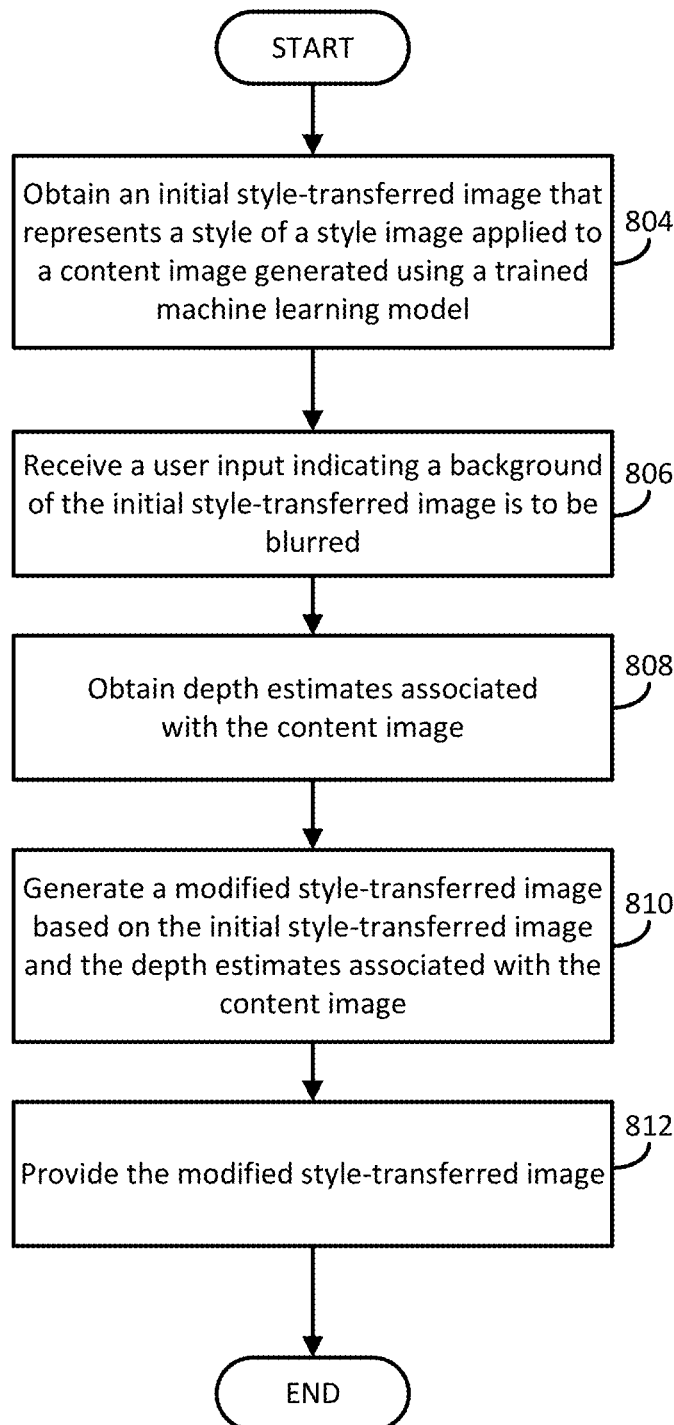
FIG. 8 shows an example process for applying a blur to a background of a style-transferred image in accordance with some embodiments.

FIG. 8 shows an example of a process 800 for blurring a background portion of an initial-style-transferred image. In some embodiments, blocks of process 800 are performed by a user device. In some embodiments, blocks of process 800 are performed in an order other than what is shown in FIG. 8. In some embodiments, two or more blocks of process 800 are performed substantially in parallel.

Process 800 begins at block 804 by obtaining an initial style-transferred image that represents a style associated with a style image applied to a content image generated using a trained machine learning model. In one example, the initial style-transferred image is generated by process 400 as shown in and described above in connection with FIG. 4.

At block 806, process 800 receives user input indicating that the background portion of the initial style-transferred image is to be blurred. In one example, the user input is a binary value indicating that the background portion is to be blurred. In some embodiments, the user input is received via a user interface, such as the user interface shown in and described above in connection with FIG. 2.

At block 808, process 800 obtains depth estimates associated with the content image. In some embodiments, the depth estimates indicate, for different pixels of the content image, an estimated depth of the content associated with the pixel. In some embodiments, the depth estimates are indicated in a matrix having the same size as a matrix associated with the content image (e.g., a matrix where each element corresponds to a pixel of the content image). In some embodiments, a value of a matrix element indicates an estimated depth of the content associated with the element. In some embodiments, values of the depth estimates are within a predetermined range, such as between 0 and 1, where a smaller value indicates a lesser depth, and where a greater value indicates a greater depth. In some embodiments, the depth estimates are obtained using a machine learning model (e.g., a self-supervised machine learning algorithm, a deep neural network, and/or any other suitable type of machine learning model) that has been trained to generate depth estimates for different images. Examples of techniques that to determine depth estimates associated with an image are described in, for example, Mertan, A., Duff, D., & Unal, G.; (2021). Single Image Depth Estimation: An Overview, which is hereby incorporated by reference in its entirety.

At block 810, process 800 generates a modified style-transferred image based on the initial style-transferred image and the depth estimates obtained at block 808. In some embodiments, process 800 generates the modified style-transferred image by modifying pixels of the initial style-transferred image based on depth estimates of corresponding pixels of the content image. For example, in some embodiments, the modified style-transferred image is generated by blurring the initial style-transferred image (e.g., by applying a Gaussian filter to the initial style-transferred image, and/or by applying any other type of low-pass filter to the initial style-transferred image) to generate a blurred version of the initial style-transferred image. In some embodiments, process 800 then generates a weighted sum of the blurred version of the initial style-transferred image and the initial style-transferred image. In some embodiments, weights associated with the weighted sum are determined based on the depth estimates. For example, in some embodiments, the blurred version of the style-transferred image is weighted more heavily for pixels associated with greater depth estimates. Conversely, in some embodiments, the blurred version of the style-transferred image is weighted less heavily for pixels associated with lesser depth estimates. An example equation for generating the modified style-transferred image (referred to herein as $I_{modified}$) is given by:

$$I_{modified} = D_{estimate} g(I_{initial}) + (1 - D_{estimate}) I_{initial}$$

In the example given above, $D_{estimate}$ is a matrix indicating depth estimates for pixels of the content image, $I_{initial}$ is the initial-style transferred image obtained at block 804, and g( ) is a Gaussian filter that effectively blurs the initial-style transferred image (e.g., by applying a low-pass filter to the initial style-transferred image).

At block 812, process 800 provides the modified style-transferred image. In some embodiments, process 800 causes the modified style transferred image to be presented, for example, on a display of a user device executing process 800. In some such embodiments, the modified style-transferred image is presented via a user interface, such as the user interface shown in and described above in connection with FIG. 2. In some embodiments, process 800 causes the modified style-transferred image to be saved, for example, in local memory of a user device executing process 800, in memory associated with a cloud-service, or the like.

Figure 9:
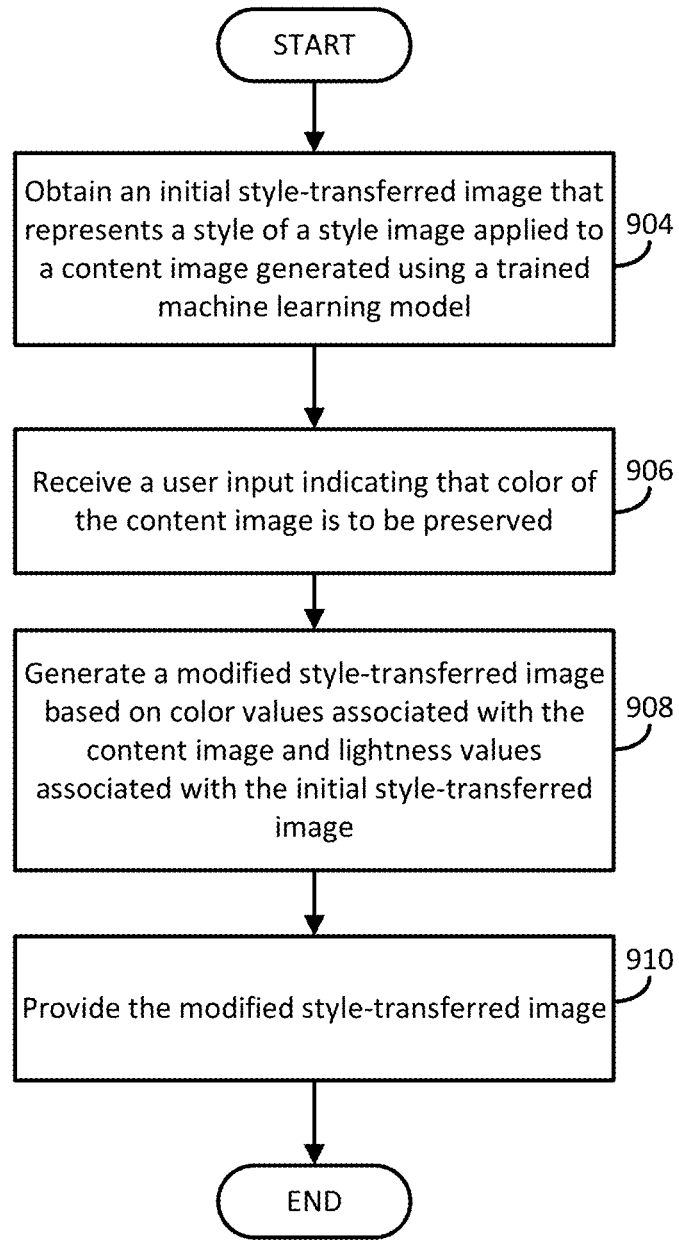
FIG. 9 shows an example process for preserving color of a content image in a style-transferred image in accordance with some embodiments.

FIG. 9 shows an example of a process 900 for preserving color from a content image when generating style-transferred image. For example, in an instance in which an initial style-transferred image is generated in which style associated with a style image has been applied to a content image, the initial style-transferred image is modified such that the pixels of the modified style-transferred image have color values corresponding to the color values of the content image. In some embodiments, the modified style-transferred image has textures associated with the style image, and content and color associated with the content image. In some embodiments, blocks of process 900 are executed by a user device. In some embodiments, blocks of process 900 are performed in an order other than what is shown in FIG. 9. In some embodiments, two or more blocks of process 900 are performed substantially in parallel.

Process 900 begins at block 904 by obtaining an initial style-transferred image that represents a style associated with a style image applied to a content image generated using a trained machine learning model. In one example, the initial style-transferred image is generated by process 400 as shown in and described above in connection with FIG. 4.

At block 906, process 900 receives user input indicating that color of the content image is to be preserved. In some embodiments, the user input is a binary value indicating that color is to be preserved. In some embodiments, the user input is received via a user interface (e.g., via a checkbox, a radio button, etc.), such as the user interface shown in and described above in connection with FIG. 2.

At block 908, process 900 generates a modified style-transferred image based on color values associated with the content image and lightness values associated with the initial style-transferred image. For example, in an instance in which a CIELAB color space is used, in some embodiments, the modified style-transferred image is generated such that the modified style-transferred image has pixels having the a and b values (corresponding to color on a green-red axis on a blue-yellow axis, respectively) of the content image and the L values (corresponding to perceptual lightness) of the initial-style transferred image.

At block 910, process 900 provides the modified style-transferred image. In some embodiments, process 900 causes the modified style transferred image to be presented, for example, on a display of a user device executing process 900. In some such embodiments, the modified style-transferred image is presented via a user interface, such as the user interface shown in and described above in connection with FIG. 2. In some embodiments, process 900 causes the modified style-transferred image to be saved, for example, in local memory of a user device executing process 900, in memory associated with a cloud-service, or the like.

Figure 10:
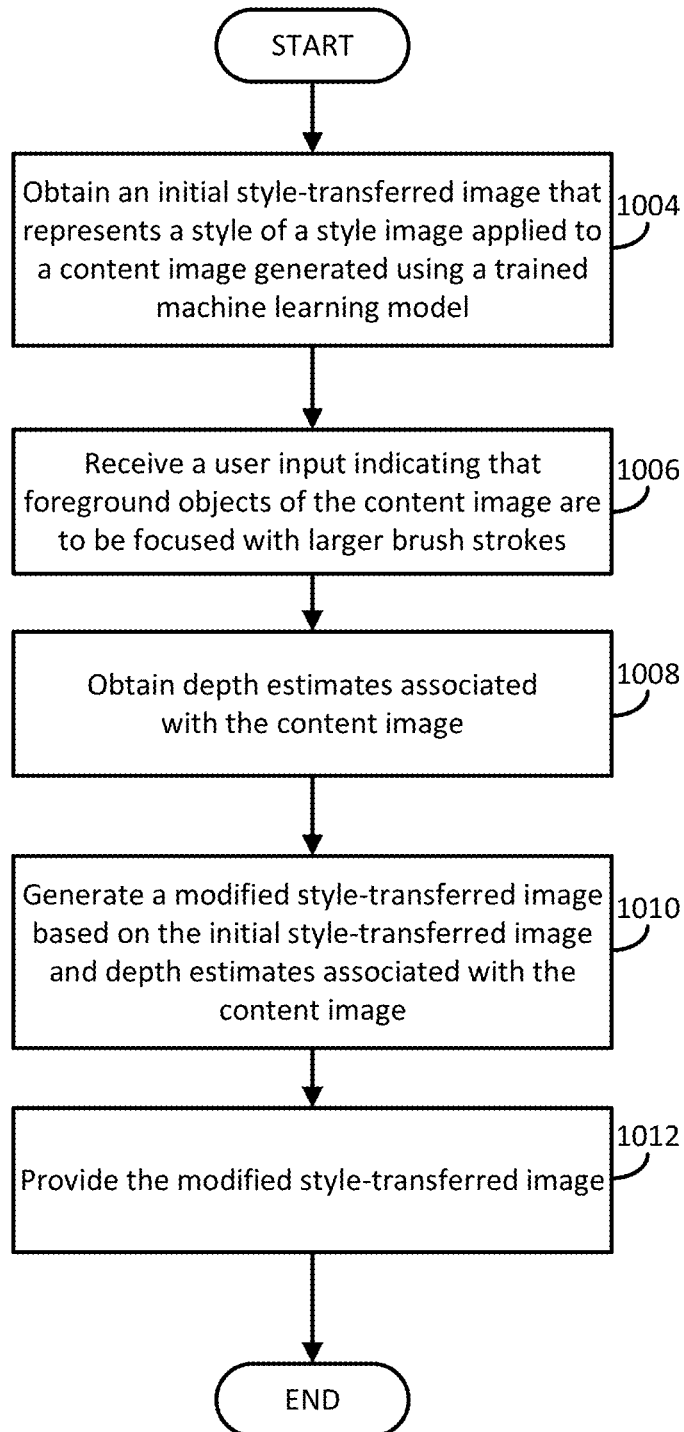
FIG. 10 shows an example process for applying a foreground focus effect to a style-transferred image in accordance with some embodiments.

FIG. 10 shows an example of a process 1000 for focusing foreground objects of the initial style-transferred image is shown in accordance with some embodiments. For example, in some embodiments, a style of the style image is applied to a foreground portion using a larger brush size than that used for a background portion, thereby causing objects in the foreground to appear to be in focus. In some embodiments, blocks of process 1000 are executed by a user device. In some embodiments, blocks of process 1000 are performed in an order other than what is shown in FIG. 10. In some embodiments, two or more blocks of process 1000 are performed substantially in parallel.

Process 1000 begins at block 1004 by obtaining an initial style-transferred image that represents a style associated with a style image applied to a content image generated using a trained machine learning model. In one example, the initial style-transferred image is generated by process 400 as shown in and described above in connection with FIG. 4.

At block 1006, process 1000 receives user input indicating that foreground objects of the content image are to be focused in a modified style-transferred image by using larger brush strokes to apply a style of the style image. In one example, the user input is a binary value indicating that the foreground objects are to be focused. In some embodiments, the user input is received via a user interface, such as the user interface shown in and described above in connection with FIG. 2.

At block 1008, process 1000 obtains depth estimates associated with the content image. In some embodiments, the depth estimates indicate, for different pixels of the content image, an estimated depth of content associated with the pixel. In some embodiments, the depth estimates are indicated in a matrix having the same size as a matrix associated with the content image (e.g., a matrix where each element corresponds to a pixel of the content image). In some embodiments, a value of a matrix element indicates an estimated depth of the content of associated with the element. In some embodiments, values of the depth estimates are within a predetermined range, such as between 0 and 1, where a smaller value indicates a lesser depth, and where a greater value indicates a greater depth. In some embodiments, the depth estimates are obtained using a machine learning model (e.g., a self-supervised machine learning algorithm, a deep neural network, and/or any other suitable type of machine learning model) that has been trained to generate depth estimates for different images. Examples of techniques that to determine depth estimates associated with an image are described in, for example, Mertan, A., Duff, D., & Unal, G.; (2021). Single Image Depth Estimation: An Overview, which is hereby incorporated by reference in its entirety.

At block 1010, process 1000 generates a modified style-transferred image based on the initial style-transferred image and the depth estimates associated with the content image obtained at block 1008. For example, process 1000 generates the modified style-transferred image by combining multiple versions of the initial style-transferred image based at least in part on depth estimates of content in the content image, where each version of the initial style-transferred image has a different resolution. For example, in some embodiments, the modified style-transferred image is generated as a weighted sum of a first version of the initial style-transferred image having a lower resolution and a second version of the initial style-transferred image having a higher resolution. In one example, the first version has a resolution of 1K×1K, and the second version has a resolution of 4K×4K. In another example, the first version has a resolution of 512×512, and the second version has a resolution of 1K×1K. In another example, the first version has a resolution of 784×784, and the second version has a resolution of 1536×1536. In some embodiments, the lower resolution version of the initial style-transferred image and the higher resolution version of the initial style-transferred image are weighted by the depth estimates associated with the content image, such that the lower resolution version is weighted more heavily for pixels determined (e.g., based on the depth estimates) to be associated with content having lesser depth (e.g., for foreground objects). Conversely, in some embodiments, the higher resolution version is weighted more heavily for pixels determined (e.g., based on the depth estimates) to be associated with content having greater depth (e.g., background objects). Because the lower resolution version of the initial style-transferred image corresponds to style of the style image applied using a larger brush size, by weighting the lower resolution version of the initial style-transferred image more heavily for pixels associated with content having a lesser depth, the corresponding pixels in the modified style-transferred image appear to have the style applied for foreground objects using a larger brush stroke. An example equation for generating the modified style-transferred image (referred to herein as $I_{modified}$) is given by:

$$I_{modified} = D_{estimate}I_{initial\_lowres} + (1-D_{estimate})I_{initial\_highres}$$

In the example given above, $D_{estimate}$ is a matrix indicating depth estimates for pixels of the content image, $I_{initial\_lowres}$ is the lower resolution version of the initial style-transferred image and $I_{initial\_highres}$ is the higher resolution version of the initial style-transferred image.

At block 1012, process 1000 provides the modified style-transferred image. In some embodiments, process 1000 causes the modified style transferred image to be presented, for example, on a display of a user device executing process 1000. In such embodiments, the modified style-transferred image is presented via a user interface, such as the user interface shown in and described above in connection with FIG. 2. In some embodiments, process 1000 causes the modified style-transferred image to be saved, for example, in local memory of a user device executing process 1000, in memory associated with a cloud-service, or the like.

In some embodiments, the techniques (e.g., methods, systems, etc.) described herein are implemented using a computing system. In one example, the computing system includes a server. In another example, the computing system includes a user device, such as a desktop computer, a laptop computer, a mobile phone, a tablet computer, a gaming console, a set-top box, a wearable computing device, a network-connected computing device, or the like. In some embodiments, the computing system is implemented as a single computing device, or as multiple communicatively coupled computing devices such as a combination of servers and/or computers coupled in a wired and/or wireless network such as the Internet, wide area network (WAN), local area network (LAN), virtual private network (VPN), intranet, etc. In some implementations, the computing system includes computing devices coupled over a local connection such as WiFi, Bluetooth, USB, etc.

Figure 11:
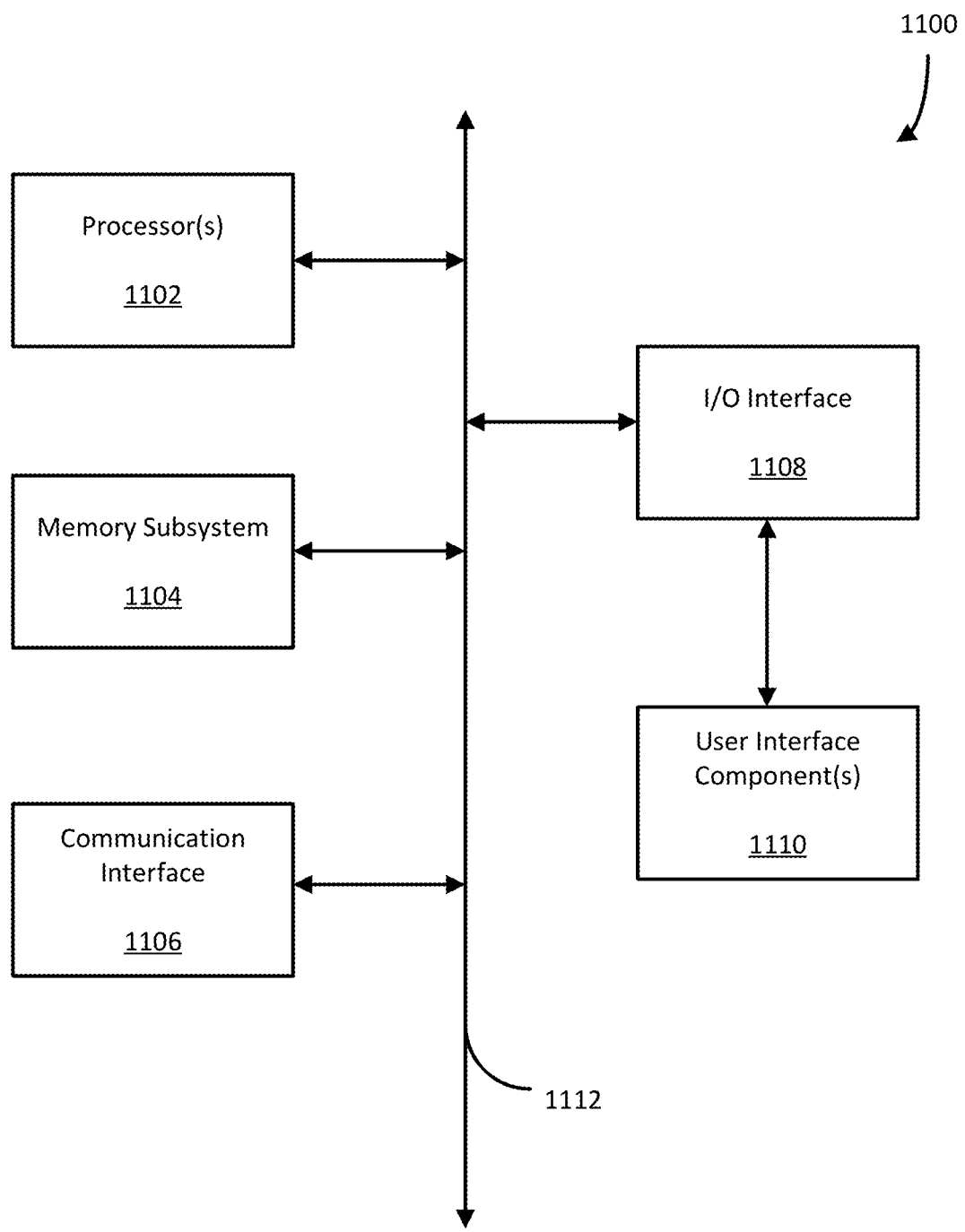
FIG. 11 shows a schematic diagram of an example computing device for implementing the methods, systems, and techniques described herein in accordance with some embodiments.

FIG. 11 shows a schematic diagram of components of a computing device 1100 that is implemented in a computing system in accordance with some implementations. As illustrated, computing device 1100 includes a bus 1112 that directly or indirectly couples one or more processors(s) 1102, a memory subsystem 1104, a communication interface 1106, an input/output (I/O) interface 1108, and/or one or more user interface components 1110. It should be noted that, in some embodiments, various other components are included in a computing device that are not shown in FIG. 11, and/or one or more components shown in FIG. 11 are omitted.

In some embodiments, computing device 1100 includes or is coupled to a memory subsystem 1104. Memory subsystem 1104 includes a computer-readable medium (e.g., non-transitory storage medium) or a combination of computer-readable media. Examples of computer-readable media include optical media (e.g., compact discs, digital video discs, or the like),magnetic media (e.g., hard disks, floppy disks, or the like),semiconductor media (e.g., flash memory, dynamic random access memory (DRAM), static random access memory (SRAM), electrically programmable read-only memory (EPROM), electrically erasable programmable read-only memory (EEPROM), or the like), or a combination thereof. In some embodiments, the computer-readable media includes non-volatile memory, volatile memory, or a combination thereof. In some embodiments, memory subsystem 1104 also includes one or more hardware devices such as a solid-state memory, one or more hard drives, one or more optical disk drives, or the like. In some embodiments, memory subsystem 1104 stores content files such as text-based files, audio files, image files, and/or video files, etc. In some implementations, the content files include documents, pictures, photos, songs, podcasts, movies, etc. In some embodiments, memory subsystem 1104 stores one or more computer program products that are each implemented as a set of instructions (e.g., program code) stored on a computer-readable medium.

A computer program product (e.g., a program stored in or downloadable onto a computer readable medium) includes instructions or program code that are executable by one or more processors (e.g., processor(s) 1102, or processor(s) of another computing device communicatively coupled to computing device 1100) to perform various operations or functions such as those described with reference to FIGS. 4-10. In some embodiments, a computer program product is referred to as a non-transitory computer readable medium storing or comprising instructions to perform certain operations or functions. Examples of a computer program product include firmware, software driver, operating system, or software application. Examples of a software application include data management application (e.g., file management application, document management application, media management application, database application, etc.), communication application (e.g., email application, messaging application, teleconference or meeting application, social media application, etc.), productivity application (e.g., document viewer application, document creation or editing application, etc.), media or interactive application (e.g., web browser, image or photo viewer, audio or video playback application, gaming application, virtual or augmented reality application, shopping application, recommendation or review application, etc.), creativity application (e.g., image, drawing, photo, audio, or video creation or editing application, web page development application, virtual or augmented reality creation or editing application, graphic design application, etc.), or the like.

In some embodiments, a computer program product such as any of the example software application are implemented using one or more neural network or machine learning models. In such embodiments, one or more neural network or matching learning models are trained using computing device 1100 (or a computing system that includes computing device 1100). Furthermore, in some implementations, computing device 1100 (or a computing system that include computing device 1100) executes the one or more neural network or machine learning models as part of the computer program product to perform inference operations. It should be noted, in some embodiments, the neural network or matching learning model(s) are trained using a computing device or system that is the same as, overlaps with, or is separate from the computing device or system performing inference operations.

Communication interface 1106 is used by computing device 1100 to communicate with one or more communication networks, and/or other electronic device(s). Example types of communication networks include wired communication networks and/or wireless communication networks. Example types of communication networks include the Internet, a wide-area network, a local-area network, a virtual private network (VPN), an Intranet, or the like. In some embodiments, communication interface 1106 utilizes various drivers, wireless communication circuitry, network interface circuitry, or the like to enable communication via various communication networks.

I/O interface 1108 includes various drivers and/or hardware circuitry for receiving input from various input devices, providing output to various output devices, or exchanging input/output with various input/output devices. Examples of devices coupled to I/O interface 1108 include peripheral devices such as a printer, a docking station, a communication hub, a charging device, etc. In some implementations, some devices coupled to I/O interface 1108 are used as user interface component(s) 1110. In one example, a user operates input elements of user interface component(s) 1110 to invoke the functionality of computing device 1100 and/or of another device communicatively coupled to computing device 1100; a user views, hears, and/or otherwise experiences output from computing device 1100 via output elements of user interface component(s) 1110. Some user interface component(s) 1110 provide both input and output functionalities. Examples of input user interface component include a mouse, a joystick, a keyboard, a microphone, a camera, or the like. Examples of output user interface component include a display screen (e.g., a monitor, an LCD display, etc.), one or more speakers, or the like. Examples of a user interface components provide both input and output functionalities include a touchscreen, haptic feedback controllers, or the like.

Various embodiments are described herein which are intended to be illustrative. Alternative embodiments may be apparent to those of ordinary skill in the art without departing from the scope of the disclosure. In one example, one or more features from one embodiment are combined with another embodiment to form an alternative embodiment. In another example, one or more features are omitted from an embodiment to form an alternative embodiment without departing from the scope of the disclosure. Additionally, it should be noted that, in some implementations, certain features described herein are utilized without reference to other features described herein.

With reference to the various processes described above, it should be understood that the order in which operations are performed is not limited to the order described herein. Moreover, in some embodiments, two or more operations are performed concurrently and/or substantially in parallel. In some embodiments, what is described as a single operation is split into two or more operations (e.g., performed by the same device, performed by two or more different devices, etc.). In some embodiments, what is described as multiple operations is combined into a single (e.g., performed by the same device, etc.). Descriptions of various blocks, modules, or components as distinct should not be construed as requiring that the blocks, modules, or components be separate (e.g., physically separate) and/or perform separate operations. For example, in some implementations, two or more blocks, modules, and/or components are merged. As another example, a single block, module, and/or components is split into multiple blocks, modules, and/or components.

The phrases "in one embodiment," "in an embodiment," "in one example," and "in an example" are used herein. It should be understood that, in some cases, these phrases refer to the same embodiments and/or examples, and, in other cases, these phrases refer to different embodiments and/or examples. The terms "comprising," "having," and "including" should be understood to be synonymous unless indicated otherwise. The phases "A and/or B" and "A or B" should be understood to mean {A}, {B}, or {A, B}. The phrase "at least one of A, B, and C" should be understood to mean {A}, {B}, {C}, {A, B}, {A, C}, {B, C}, or {A, B, C}.

The invention claimed is:

1. A method for generating style-transferred images, comprising:
   obtaining, via a user interface, a style image and a content image;
   applying the style image to an encoder network of a machine learning model;
   applying the content image to the encoder network;
   for each of a plurality of layers of the encoder network:
      extracting a first set of features associated with the style image and a second set of features associated with the content image; and
      merging the first set of features and the second set of features to generate a merged set of features by scaling and shifting the second set of features associated with the content image generated by a given layer of the encoder network based on statistics associated with the first set of features associated with the style image generated by the corresponding layer of the encoder network such that the first set of features and the second set of features are merged separately for each layer of the encoder network;
   generating a style-transferred image with a decoder network of the machine learning model based on a plurality of merged sets of features, wherein each merged set of features corresponds to one of the plurality of layers of the encoder network; and
   presenting the style-transferred image in the user interface.

2. The method of claim 1, wherein merging the first set of features and the second set of features comprises matching means of the second set of features with means of the first set of features, and matching variances of the second set of features with variances of the second set of features.

3. The method of claim 1, further comprising for each of the plurality of layers of the encoder network, modifying the corresponding merged set of features by applying the merged set of features to a residual block, wherein the modified merged set of features is provided to the decoder network to generate the style-transferred image.

4. The method of claim 3, wherein the decoder network combines the modified merged sets of features corresponding to each of the plurality of layers of the encoder network to generate the style-transferred image.

5. The method of claim 1, wherein the encoder network is a convolution neural network.

6. The method of claim 1, wherein the plurality of layers from which the first set of features and the second set of features are extracted includes multiple layers that operate on different pixel scales.

7. The method of claim 1, wherein the plurality of layers includes four different layers of a convolution neural network.

8. The method of claim 1, wherein the machine learning model is trained by:
   obtaining a training set comprising a plurality of style images and a corresponding plurality of content images;
   for each style image and corresponding content image in the training set:
      for each of a plurality of layers of the encoder network:
         (i) extracting a first set of features associated with the style image and a second set of features associated with the content image; and (ii) merging the first set of features and the second set of features to generate a merged set of features,
      generating a style-transferred image with the decoder network based on a plurality of merged sets of features, wherein each merged set of features correspond to one of the plurality of layers of the encoder network, and
      determining a style loss term that represents a difference between features extracted from the style-transferred image and features extracted from the style image and a content loss term that represents a difference between features extracted from the style-transferred image and features extracted from the content image; and
   determining weights associated with the decoder network based at least in part on the style loss term and the content loss term.

9. The method of claim 8, wherein merging the first set of features and the second set of features comprises matching means of the second set of features with means of the first set of features, and matching variances of the second set of features with variances of the second set of features.

10. The method of claim 8, further comprising, for each of the plurality of layers of the encoder network, modifying the corresponding merged set of features by applying the merged set of features to a residual block, wherein the modified merged set of features is provided to the decoder network to generate the style-transferred image.

11. The method of claim 10, further comprising determining weights associated with the residual block based at least in part on the style loss term and the content loss term.

12. The method of claim 8, wherein the features extracted from the style-transferred image are extracted by the encoder network.

13. The method of claim 8, wherein the style loss term represents the difference between features extracted from the style-transferred image and the features extracted from the style image at each of the plurality of layers of the encoder network and wherein the content loss term represents the difference between features extracted from the style-transferred image and the features extracted from the content image at one layer of the plurality of layers of the encoder network.

14. A non-transitory computer-readable medium comprising instructions that, when executed by at least one processor, cause the at least one processor to perform operations comprising:
   obtaining, via a user interface, a style image and a content image;
   applying the style image to an encoder network of a machine learning model;
   applying the content image to the encoder network;
   for each of a plurality of layers of the encoder network:
      extracting a first set of features associated with the style image and a second set of features associated with the content image; and
      merging the first set of features and the second set of features to generate a merged set of features by scaling and shifting the second set of features associated with the content image generated by a given layer of the encoder network based on statistics associated with the first set of features associated with the style image generated by the corresponding layer of the encoder network such that the first set of features and the second set of features are merged separately for each layer of the encoder network;

generating a style-transferred image with a decoder network of the machine learning model based on a plurality of merged sets of features, wherein each merged set of features corresponds to one of the plurality of layers of the encoder network; and presenting the style-transferred image in the user interface.

15. The non-transitory computer-readable medium of claim 14, wherein merging the first set of features and the second set of features comprises matching means of the second set of features with means of the first set of features, and matching variances of the second set of features with variances of the second set of features.

16. The non-transitory computer-readable medium of claim 14, wherein the operations further comprise, for each of the plurality of layers of the encoder network, modifying the corresponding merged set of features by applying the merged set of features to a residual block, wherein the modified merged set of features is provided to the decoder network to generate the style-transferred image.

17. The non-transitory computer-readable medium of claim 16, wherein the decoder network combines the modified merged sets of features corresponding to each of the plurality of layers of the encoder network to generate the style-transferred image.

18. The non-transitory computer-readable medium of claim 14, wherein the encoder network is a convolution neural network.

19. The non-transitory computer-readable medium of claim 14, wherein the plurality of layers from which the first set of features and the second set of features are extracted includes multiple layers that operate on different pixel scales.

20. A computing system for generating style-transferred images, comprising:
   one or more processors; and
   a computer-readable storage medium, coupled with the one or more processors, having instructions stored thereon that, when executed by the one or more processors, cause the one or more processors to perform operations comprising:
      obtaining, via a user interface, a style image and a content image;
      applying the style image to an encoder network of a machine learning model;
      applying the content image to the encoder network;
      for each of a plurality of layers of the encoder network:
         extracting a first set of features associated with the style image and a second set of features associated with the content image; and
         merging the first set of features and the second set of features to generate a merged set of features by scaling and shifting the second set of features associated with the content image generated by a given layer of the encoder network based on statistics associated with the first set of features associated with the style image generated by the corresponding layer of the encoder network such that the first set of features and the second set of features are merged separately for each layer of the encoder network;
      generating a style-transferred image with a decoder network of the machine learning model based on a plurality of merged sets of features, wherein each merged set of features corresponds to one of the plurality of layers of the encoder network; and
      presenting the style-transferred image in the user interface.

* * * * *